US010573341B2

(12) United States Patent
Tada et al.

(10) Patent No.: US 10,573,341 B2
(45) Date of Patent: *Feb. 25, 2020

(54) MAGNETIC TAPE AND METHOD OF MANUFACTURING THE SAME

(71) Applicant: FUJIFILM Corporation, Tokyo (JP)

(72) Inventors: Toshio Tada, Minami-ashigara (JP); Norihito Kasada, Minami-ashigara (JP); Masahito Oyanagi, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/388,911

(22) Filed: Dec. 22, 2016

(65) Prior Publication Data

US 2017/0186456 A1 Jun. 29, 2017

(30) Foreign Application Priority Data

Dec. 25, 2015 (JP) .................. 2015-254186

(51) Int. Cl.
G11B 5/714 (2006.01)
G11B 5/845 (2006.01)
G11B 5/708 (2006.01)
G11B 5/712 (2006.01)
G11B 5/78 (2006.01)

(52) U.S. Cl.
CPC .............. *G11B 5/714* (2013.01); *G11B 5/708* (2013.01); *G11B 5/712* (2013.01); *G11B 5/78* (2013.01); *G11B 5/845* (2013.01)

(58) Field of Classification Search
None
See application file for complete search history.

(56) References Cited

U.S. PATENT DOCUMENTS

| 3,966,686 | A |   | 6/1976  | Asakura et al. |
| 4,112,187 | A |   | 9/1978  | Asakura et al. |
| 4,425,404 | A |   | 1/1984  | Suzuki et al. |
| 4,693,930 | A |   | 9/1987  | Kuo et al. |
| 4,746,569 | A |   | 5/1988  | Takahashi et al. |
| 4,825,317 | A |   | 4/1989  | Rausch |
| 5,242,752 | A |   | 9/1993  | Isobe et al. |
| 5,419,938 | A |   | 5/1995  | Kagotani et al. |
| 5,445,881 | A |   | 9/1995  | Irie |
| 5,474,814 | A |   | 12/1995 | Komatsu et al. |
| 5,496,607 | A |   | 3/1996  | Inaba et al. |
| 5,540,957 | A |   | 7/1996  | Ueda et al. |
| 5,585,032 | A | * | 12/1996 | Nakata ............... G11B 5/70678 252/62.59 |
| 5,645,917 | A |   | 7/1997  | Ejiri et al. |
| 5,689,384 | A |   | 11/1997 | Albrecht et al. |
| 5,728,454 | A | * | 3/1998  | Inaba .................. G11B 5/70 427/128 |
| 5,786,074 | A |   | 6/1998  | Soui |
| 5,827,600 | A |   | 10/1998 | Ejiri et al. |
| 5,835,314 | A |   | 11/1998 | Moodera et al. |
| 6,099,957 | A |   | 8/2000  | Yamamoto et al. |
| 6,183,606 | B1 |   | 2/2001 | Kuo et al. |
| 6,207,252 | B1 |   | 3/2001 | Osamu |
| 6,228,461 | B1 |   | 5/2001 | Sueki et al. |
| 6,254,964 | B1 |   | 7/2001 | Saito et al. |
| 6,261,647 | B1 |   | 7/2001 | Komatsu et al. |
| 6,268,043 | B1 |   | 7/2001 | Koizumi et al. |
| 6,496,328 | B1 |   | 12/2002 | Dugas |
| 6,579,826 | B2 |   | 6/2003 | Furuya et al. |
| 6,649,256 | B1 |   | 11/2003 | Buczek et al. |
| 6,686,022 | B2 |   | 2/2004 | Takano et al. |

(Continued)

FOREIGN PATENT DOCUMENTS

DE 101 46 429 A1 3/2002
EP 0 520 155 B1 8/1996

(Continued)

OTHER PUBLICATIONS

U.S. Appl. No. 15/854,438, Allowed; RCE filed.
U.S. Appl. No. 15/920,563, Petition to Withdraw from Issue and RCE filed.
U.S. Appl. No. 15/900,164, Pending.
U.S. Appl. No. 15/899,430, Pending.
U.S. Appl. No. 15/920,515, Pending.
U.S. Appl. No. 15/920,517, Pending.
U.S. Appl. No. 15/920,538, Pending.
U.S. Appl. No. 15/920,544, Pending.
U.S. Appl. No. 15/920,768, QPIDS filed Dec. 10, 2018.
U.S. Appl. No. 16/009,603, Pending.
U.S. Appl. No. 16/182,083, Pending (Not yet published; continuation of U.S. Appl. No. 15/920,768).
U.S. Appl. No. 15/620,916, Pending.
U.S. Appl. No. 15/621,464, Pending.
U.S. Appl. No. 15/626,720, Pending.
U.S. Appl. No. 15/854,383, Pending.
U.S. Appl. No. 15/854,439, Pending.
U.S. Appl. No. 15/848,173, Pending.
U.S. Appl. No. 15/628,814, Pending.
U.S. Appl. No. 15/690,400, Pending.

(Continued)

Primary Examiner — Kevin M Bernatz
(74) Attorney, Agent, or Firm — Sughrue Mion, PLLC

(57) ABSTRACT

The magnetic tape has a nonmagnetic layer containing nonmagnetic powder and binder on a nonmagnetic support and a magnetic layer containing ferromagnetic powder and binder on the nonmagnetic layer, wherein a fatty acid ester is contained in at least the magnetic layer, the ferromagnetic powder is ferromagnetic hexagonal ferrite powder, the ferromagnetic hexagonal ferrite powder has a crystallite volume as determined by X-ray diffraction analysis ranges from 1,000 nm$^3$ to 2,400 nm$^3$, and a ratio of the crystallite size $D_{x(107)}$ obtained from a diffraction peak of a (107) plane to a particle size in a direction of an easy axis of magnetization $D_{TEM}$ as determined by observation with a transmission electron microscope, $D_{x(107)}/D_{TEM}$, is greater than or equal to 1.1, and ΔSFD in a longitudinal direction of the magnetic tape as calculated with Equation 1: $\Delta SFD = SFD_{25°\,C.} - SFD_{-190°\,C.}$, ranges from 0.50 to 1.60.

17 Claims, No Drawings

(56) References Cited

U.S. PATENT DOCUMENTS

| | | | |
|---|---|---|---|
| 6,770,359 B2 | 8/2004 | Masaki | |
| 6,791,803 B2 | 9/2004 | Saito et al. | |
| 6,835,451 B2 | 12/2004 | Ejiri | |
| 6,835,461 B1 | 12/2004 | Yamagata et al. | |
| 6,921,592 B2 | 7/2005 | Tani et al. | |
| 6,939,606 B2 | 9/2005 | Hashimoto et al. | |
| 6,950,269 B1 | 9/2005 | Johnson | |
| 6,994,925 B2 | 2/2006 | Masaki | |
| 7,014,927 B2 | 3/2006 | Sueki et al. | |
| 7,029,726 B1 | 4/2006 | Chen et al. | |
| 7,153,366 B1 | 12/2006 | Chen et al. | |
| 7,255,908 B2 | 8/2007 | Ishikawa et al. | |
| 7,511,907 B2 | 3/2009 | Dugas et al. | |
| 7,515,383 B2 | 4/2009 | Saito et al. | |
| 7,656,602 B2 | 2/2010 | Iben et al. | |
| 7,803,471 B1 | 9/2010 | Ota et al. | |
| 7,839,599 B2 | 11/2010 | Bui et al. | |
| 8,000,057 B2 | 8/2011 | Bui et al. | |
| 8,318,242 B2 | 11/2012 | Bradshaw et al. | |
| 8,524,108 B2 | 9/2013 | Hattori | |
| 8,535,817 B2 | 9/2013 | Imaoka | |
| 8,576,510 B2 | 11/2013 | Cherubini et al. | |
| 8,681,451 B2 | 3/2014 | Harasawa et al. | |
| 9,105,294 B2 | 8/2015 | Jensen et al. | |
| 9,159,341 B2 | 10/2015 | Bradshaw et al. | |
| 9,311,946 B2 | 4/2016 | Tanaka et al. | |
| 9,324,343 B2 | 4/2016 | Bradshaw et al. | |
| 9,495,985 B2 | 11/2016 | Biskeborn et al. | |
| 9,530,444 B2 | 12/2016 | Kasada | |
| 9,542,967 B2 | 1/2017 | Sekiguchi et al. | |
| 9,564,161 B1 | 2/2017 | Cherubini et al. | |
| 9,601,146 B2 * | 3/2017 | Kasada | G11B 5/78 |
| 9,704,425 B2 | 7/2017 | Zhang et al. | |
| 9,704,525 B2 | 7/2017 | Kasada | |
| 9,704,527 B2 | 7/2017 | Kasada | |
| 9,711,174 B2 | 7/2017 | Kasada et al. | |
| 9,721,605 B2 | 8/2017 | Oyanagi et al. | |
| 9,721,606 B2 | 8/2017 | Kasada | |
| 9,721,607 B2 * | 8/2017 | Tada | G11B 5/842 |
| 9,748,026 B2 | 8/2017 | Shirata | |
| 9,773,519 B2 * | 9/2017 | Kasada | G11B 5/5928 |
| 9,779,772 B1 | 10/2017 | Kasada et al. | |
| 9,837,104 B1 | 12/2017 | Biskeborn | |
| 9,837,116 B2 | 12/2017 | Ozawa et al. | |
| 9,959,894 B2 | 5/2018 | Omura | |
| 9,972,351 B1 | 5/2018 | Kaneko et al. | |
| 9,978,414 B1 | 5/2018 | Kaneko et al. | |
| 9,984,710 B2 | 5/2018 | Kasada | |
| 9,984,712 B1 | 5/2018 | Ozawa | |
| 9,984,716 B1 | 5/2018 | Kaneko et al. | |
| 10,008,230 B1 | 6/2018 | Ozawa et al. | |
| 10,026,430 B2 | 7/2018 | Kasada et al. | |
| 10,026,433 B2 | 7/2018 | Kasada et al. | |
| 10,026,434 B2 | 7/2018 | Oyanagi et al. | |
| 10,026,435 B2 | 7/2018 | Kasada et al. | |
| 10,062,403 B1 | 8/2018 | Kasada et al. | |
| 10,074,393 B2 | 9/2018 | Kaneko et al. | |
| 10,134,433 B2 * | 11/2018 | Kasada | G11B 5/70 |
| 10,170,144 B2 | 1/2019 | Ozawa et al. | |
| 10,360,937 B2 * | 7/2019 | Ozawa | G11B 5/3909 |
| 10,403,319 B2 * | 9/2019 | Kasada | G11B 5/70 |
| 10,431,250 B2 * | 10/2019 | Tada | G11B 5/712 |
| 2001/0038928 A1 | 11/2001 | Nakamigawa et al. | |
| 2001/0053458 A1 | 12/2001 | Suzuki et al. | |
| 2002/0072472 A1 | 7/2002 | Furuya et al. | |
| 2002/0122339 A1 | 9/2002 | Takano et al. | |
| 2003/0059649 A1 | 3/2003 | Saliba et al. | |
| 2003/0091866 A1 | 5/2003 | Ejiri et al. | |
| 2003/0124386 A1 | 7/2003 | Masaki | |
| 2003/0128453 A1 | 7/2003 | Saito et al. | |
| 2003/0170498 A1 | 9/2003 | Inoue | |
| 2003/0228493 A1 | 12/2003 | Doushita et al. | |
| 2004/0018388 A1 | 1/2004 | Kitamura et al. | |
| 2004/0053074 A1 | 3/2004 | Jingu et al. | |
| 2004/0072025 A1 | 4/2004 | Kishimoto et al. | |
| 2004/0197605 A1 | 10/2004 | Seki et al. | |
| 2004/0213948 A1 | 10/2004 | Saito et al. | |
| 2004/0218304 A1 | 11/2004 | Goker et al. | |
| 2004/0265643 A1 | 12/2004 | Ejiri | |
| 2005/0057838 A1 | 3/2005 | Ohtsu | |
| 2005/0153170 A1 | 7/2005 | Inoue et al. | |
| 2005/0196645 A1 | 9/2005 | Doi et al. | |
| 2005/0260456 A1 | 11/2005 | Hanai et al. | |
| 2005/0260459 A1 | 11/2005 | Hanai et al. | |
| 2005/0264935 A1 | 12/2005 | Sueki et al. | |
| 2006/0008681 A1 | 1/2006 | Hashimoto et al. | |
| 2006/0035114 A1 | 2/2006 | Kuse et al. | |
| 2006/0056095 A1 | 3/2006 | Saitou | |
| 2006/0068232 A1 | 3/2006 | Mikamo et al. | |
| 2006/0187589 A1 | 8/2006 | Harasawa et al. | |
| 2006/0232883 A1 | 10/2006 | Biskeborn et al. | |
| 2007/0009769 A1 | 1/2007 | Kanazawa | |
| 2007/0020489 A1 | 1/2007 | Yamazaki et al. | |
| 2007/0020490 A1 | 1/2007 | Harasawa et al. | |
| 2007/0224456 A1 | 9/2007 | Murao et al. | |
| 2007/0230054 A1 | 10/2007 | Takeda et al. | |
| 2007/0231606 A1 | 10/2007 | Hanai | |
| 2008/0057351 A1 | 3/2008 | Meguro et al. | |
| 2008/0144211 A1 | 6/2008 | Weber et al. | |
| 2008/0152956 A1 | 6/2008 | Murayama et al. | |
| 2008/0174897 A1 | 7/2008 | Bates et al. | |
| 2008/0297950 A1 | 12/2008 | Noguchi et al. | |
| 2008/0311308 A1 | 12/2008 | Lee et al. | |
| 2009/0027812 A1 | 1/2009 | Noguchi et al. | |
| 2009/0087689 A1 | 4/2009 | Doushita et al. | |
| 2009/0161249 A1 | 6/2009 | Takayama et al. | |
| 2009/0162701 A1 | 6/2009 | Jensen et al. | |
| 2010/0000966 A1 | 1/2010 | Kamata et al. | |
| 2010/0035086 A1 | 2/2010 | Inoue et al. | |
| 2010/0035088 A1 | 2/2010 | Inoue | |
| 2010/0053810 A1 | 3/2010 | Biskeborn et al. | |
| 2010/0073816 A1 | 3/2010 | Komori et al. | |
| 2010/0081011 A1 | 4/2010 | Nakamura | |
| 2010/0134929 A1 | 6/2010 | Ito | |
| 2010/0227201 A1 | 9/2010 | Sasaki et al. | |
| 2010/0246073 A1 | 9/2010 | Katayama | |
| 2011/0003241 A1 | 1/2011 | Kaneko et al. | |
| 2011/0051280 A1 | 3/2011 | Karp et al. | |
| 2011/0052908 A1 | 3/2011 | Imaoka | |
| 2011/0077902 A1 | 3/2011 | Awezec et al. | |
| 2011/0151281 A1 | 6/2011 | Inoue | |
| 2011/0244272 A1 | 10/2011 | Suzuki et al. | |
| 2012/0045664 A1 | 2/2012 | Tanaka et al. | |
| 2012/0152891 A1 | 6/2012 | Brown et al. | |
| 2012/0177951 A1 | 7/2012 | Yamazaki et al. | |
| 2012/0183811 A1 | 7/2012 | Hattori et al. | |
| 2012/0196156 A1 | 8/2012 | Suzuki | |
| 2012/0243120 A1 | 9/2012 | Harasawa et al. | |
| 2012/0244387 A1 | 9/2012 | Mori et al. | |
| 2012/0251845 A1 | 10/2012 | Wang et al. | |
| 2013/0029183 A1 | 1/2013 | Omura et al. | |
| 2013/0084470 A1 | 4/2013 | Hattori et al. | |
| 2013/0088794 A1 | 4/2013 | Cherubini et al. | |
| 2013/0256584 A1 | 10/2013 | Yamazaki et al. | |
| 2013/0260179 A1 | 10/2013 | Kasada et al. | |
| 2013/0279040 A1 | 10/2013 | Cideciyan et al. | |
| 2013/0286510 A1 | 10/2013 | Rothermel et al. | |
| 2014/0011055 A1 | 1/2014 | Suzuki et al. | |
| 2014/0130067 A1 | 5/2014 | Madison et al. | |
| 2014/0139944 A1 | 5/2014 | Johnson et al. | |
| 2014/0272474 A1 | 9/2014 | Kasada | |
| 2014/0295214 A1 * | 10/2014 | Tada | H01F 1/11 428/842.3 |
| 2014/0342189 A1 | 11/2014 | Tachibana et al. | |
| 2014/0366990 A1 | 12/2014 | Lai et al. | |
| 2014/0374645 A1 | 12/2014 | Kikuchi et al. | |
| 2015/0043101 A1 | 2/2015 | Biskeborn et al. | |
| 2015/0098149 A1 | 4/2015 | Bates et al. | |
| 2015/0111066 A1 | 4/2015 | Terakawa et al. | |
| 2015/0123026 A1 | 5/2015 | Masada et al. | |
| 2015/0302879 A1 | 10/2015 | Holmberg et al. | |
| 2015/0380036 A1 | 12/2015 | Kasada et al. | |
| 2016/0061447 A1 | 3/2016 | Kobayashi | |
| 2016/0064025 A1 | 3/2016 | Kurokawa et al. | |

(56) References Cited

U.S. PATENT DOCUMENTS

| | | |
|---|---|---|
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1 | 3/2017 | Ozawa et al. |
| 2017/0130156 A1 | 5/2017 | Kondo et al. |
| 2017/0178675 A1 | 6/2017 | Kasada |
| 2017/0178676 A1 | 6/2017 | Kasada |
| 2017/0178677 A1* | 6/2017 | Kasada ............... G11B 5/78 |
| 2017/0186460 A1 | 6/2017 | Kasada et al. |
| 2017/0221513 A1 | 8/2017 | Hiroi et al. |
| 2017/0221516 A1 | 8/2017 | Oyanagi et al. |
| 2017/0221517 A1 | 8/2017 | Ozawa et al. |
| 2017/0249963 A1 | 8/2017 | Oyanagi et al. |
| 2017/0249964 A1 | 8/2017 | Kasada et al. |
| 2017/0249965 A1 | 8/2017 | Kurokawa et al. |
| 2017/0249966 A1 | 8/2017 | Tachibana et al. |
| 2017/0287517 A1* | 10/2017 | Hosoya ............. G11B 5/70615 |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1 | 12/2017 | Kasada et al. |
| 2017/0372736 A1 | 12/2017 | Kaneko et al. |
| 2017/0372737 A1 | 12/2017 | Oyanagi et al. |
| 2017/0372738 A1 | 12/2017 | Kasada |
| 2017/0372739 A1 | 12/2017 | Ozawa et al. |
| 2017/0372740 A1 | 12/2017 | Ozawa et al. |
| 2017/0372741 A1 | 12/2017 | Kurokawa et al. |
| 2017/0372742 A1 | 12/2017 | Kaneko et al. |
| 2017/0372743 A1 | 12/2017 | Kasada et al. |
| 2017/0372744 A1 | 12/2017 | Ozawa et al. |
| 2018/0061446 A1 | 3/2018 | Kasada |
| 2018/0061447 A1 | 3/2018 | Kasada |
| 2018/0082710 A1 | 3/2018 | Tada et al. |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182426 A1 | 6/2018 | Ozawa et al. |
| 2018/0182427 A1 | 6/2018 | Kasada et al. |
| 2018/0182429 A1 | 6/2018 | Kasada et al. |
| 2018/0182430 A1 | 6/2018 | Ozawa et al. |
| 2018/0182428 A1 | 7/2018 | Kasada et al. |
| 2018/0240475 A1 | 8/2018 | Kasada |
| 2018/0240476 A1 | 8/2018 | Kasada et al. |
| 2018/0240478 A1 | 8/2018 | Kasada et al. |
| 2018/0240479 A1* | 8/2018 | Kasada ............. G11B 5/00813 |
| 2018/0240481 A1 | 8/2018 | Kasada et al. |
| 2018/0240488 A1 | 8/2018 | Kasada |
| 2018/0240489 A1* | 8/2018 | Kasada ............... G11B 5/70 |
| 2018/0240490 A1 | 8/2018 | Kurokawa et al. |
| 2018/0240491 A1 | 8/2018 | Ozawa et al. |
| 2018/0240492 A1 | 8/2018 | Kasada |
| 2018/0240493 A1* | 8/2018 | Tada ................... G11B 5/712 |
| 2018/0240494 A1 | 8/2018 | Kurokawa et al. |
| 2018/0240495 A1 | 8/2018 | Kasada |
| 2018/0286439 A1 | 10/2018 | Ozawa et al. |
| 2018/0286442 A1 | 10/2018 | Ozawa et al. |
| 2018/0286443 A1 | 10/2018 | Ozawa et al. |
| 2018/0286444 A1 | 10/2018 | Kasada et al. |
| 2018/0286446 A1 | 10/2018 | Ozawa et al. |
| 2018/0286447 A1 | 10/2018 | Ozawa et al. |
| 2018/0286448 A1* | 10/2018 | Ozawa ................ G11B 5/714 |
| 2018/0286449 A1 | 10/2018 | Kasada et al. |
| 2018/0286450 A1 | 10/2018 | Kasada et al. |
| 2018/0286451 A1* | 10/2018 | Ozawa ................ G11B 5/70 |
| 2018/0286452 A1 | 10/2018 | Ozawa et al. |
| 2018/0286453 A1 | 10/2018 | Kasada et al. |
| 2018/0301165 A1 | 10/2018 | Oyanagi et al. |
| 2018/0350398 A1 | 12/2018 | Kawakami et al. |
| 2018/0350400 A1 | 12/2018 | Kaneko et al. |
| 2018/0358042 A1 | 12/2018 | Kasada et al. |
| 2018/0374507 A1 | 12/2018 | Kasada |
| 2019/0027167 A1 | 1/2019 | Tada et al. |
| 2019/0027168 A1 | 1/2019 | Kasada et al. |
| 2019/0027171 A1 | 1/2019 | Kasada |
| 2019/0027172 A1 | 1/2019 | Kasada |
| 2019/0027174 A1 | 1/2019 | Tada et al. |
| 2019/0027175 A1 | 1/2019 | Kurokawa et al. |
| 2019/0027176 A1 | 1/2019 | Kurokawa et al. |
| 2019/0027177 A1 | 1/2019 | Kasada |
| 2019/0027178 A1 | 1/2019 | Kasada |
| 2019/0027179 A1 | 1/2019 | Ozawa et al. |
| 2019/0027180 A1 | 1/2019 | Kasada et al. |
| 2019/0027181 A1 | 1/2019 | Ozawa et al. |
| 2019/0035424 A1 | 1/2019 | Endo |
| 2019/0051325 A1* | 2/2019 | Kasada ............... G11B 5/70 |
| 2019/0088278 A1 | 3/2019 | Kasada et al. |
| 2019/0096437 A1* | 3/2019 | Ozawa ................ G11B 5/70 |
| 2019/0103130 A1* | 4/2019 | Kasada ............. G11B 5/00813 |
| 2019/0103131 A1 | 4/2019 | Kasada et al. |
| 2019/0103133 A1 | 4/2019 | Ozawa et al. |
| 2019/0103134 A1 | 4/2019 | Kasada et al. |
| 2019/0103135 A1 | 4/2019 | Ozawa et al. |
| 2019/0130936 A1 | 5/2019 | Kaneko et al. |
| 2019/0295590 A1 | 9/2019 | Kaneko et al. |

FOREIGN PATENT DOCUMENTS

| | | |
|---|---|---|
| GB | 2495356 A | 4/2013 |
| JP | 61-139932 A | 6/1986 |
| JP | 63-129519 A | 6/1988 |
| JP | 63-249932 A | 10/1988 |
| JP | 63-298813 A | 12/1988 |
| JP | 61-11924 A | 1/1989 |
| JP | 64-57422 A | 3/1989 |
| JP | 64-60819 A | 3/1989 |
| JP | 2-227821 A | 9/1990 |
| JP | 5-258283 A | 10/1993 |
| JP | 5-298653 A | 11/1993 |
| JP | 7-57242 A | 3/1995 |
| JP | 11-110743 A | 4/1999 |
| JP | 11-175949 A | 7/1999 |
| JP | 11-259849 A | 9/1999 |
| JP | 11-273051 A | 10/1999 |
| JP | 2000-251240 A | 9/2000 |
| JP | 2002-157726 A | 5/2002 |
| JP | 2002-298332 A | 10/2002 |
| JP | 2002-329605 A | 11/2002 |
| JP | 2002-367142 A | 12/2002 |
| JP | 2002-367318 A | 12/2002 |
| JP | 2003-77116 A | 3/2003 |
| JP | 2003-323710 A | 11/2003 |
| JP | 2004-005820 A | 1/2004 |
| JP | 2004-103186 A | 4/2004 |
| JP | 2004-114492 A | 4/2004 |
| JP | 2004-133997 A | 4/2004 |
| JP | 2004-185676 A | 7/2004 |
| JP | 2005-38579 A | 2/2005 |
| JP | 2005-092967 A | 4/2005 |
| JP | 2005-243063 A | 9/2005 |
| JP | 2005-243162 A | 9/2005 |
| JP | 2006-92672 A | 4/2006 |
| JP | 2006-286114 A | 10/2006 |
| JP | 2007-265555 A | 10/2007 |
| JP | 2007-273039 A | 10/2007 |
| JP | 2007-287310 A | 11/2007 |
| JP | 2007-297427 A | 11/2007 |
| JP | 2007-305197 A | 11/2007 |
| JP | 2008-047276 A | 2/2008 |
| JP | 2008-243317 A | 10/2008 |
| JP | 2009-245515 A | 10/2009 |
| JP | 2009-283082 A | 12/2009 |

(56) References Cited

FOREIGN PATENT DOCUMENTS

| | | |
|---|---|---|
| JP | 2010-036350 A | 2/2010 |
| JP | 2010-49731 A | 3/2010 |
| JP | 2011-48878 A | 3/2011 |
| JP | 2011-138566 A | 7/2011 |
| JP | 2011-187142 A | 9/2011 |
| JP | 2011-210288 A | 10/2011 |
| JP | 2011-225417 A | 11/2011 |
| JP | 2012-038367 A | 2/2012 |
| JP | 2012-043495 A | 3/2012 |
| JP | 2012-203955 A | 10/2012 |
| JP | 2013-25853 A | 2/2013 |
| JP | 2013-77360 A | 4/2013 |
| JP | 2013-164889 A | 8/2013 |
| JP | 2014-15453 A | 1/2014 |
| JP | 2014-179149 A | 9/2014 |
| JP | 2015-39801 A | 3/2015 |
| JP | 2015-111484 A | 6/2015 |
| JP | 2016-15183 A | 1/2016 |
| JP | 2016-502224 A | 1/2016 |
| JP | 2016-051493 A | 4/2016 |
| JP | 2016-071912 A | 5/2016 |
| JP | 2016-71926 A | 5/2016 |
| JP | 2016-126817 A | 7/2016 |
| JP | 2016-139451 A | 8/2016 |
| JP | 2016-177851 A | 10/2016 |
| JP | 2017-041291 A | 2/2017 |

OTHER PUBLICATIONS

U.S. Appl. No. 15/690,906, Pending.
U.S. Appl. No. 15/626,355, Pending.
U.S. Appl. No. 15/627,696, Pending.
U.S. Appl. No. 15/380,309, Pending.
U.S. Appl. No. 15/280,195, Pending.
U.S. Appl. No. 15/422,821, Pending.
U.S. Appl. No. 15/422,944, Allowed.
U.S. Appl. No. 15/619,012, Pending.
U.S. Appl. No. 15/624,897 Allowed; RCE filed Nov. 21, 2018.
U.S. Appl. No. 15/624,792, Allowed; RCE filed Nov. 21, 2018.
U.S. Appl. No. 15/626,832 Allowed; RCE filed Nov. 21, 2018.
U.S. Appl. No. 15/625,428, Allowed Dec. 4, 2018; RCE filed.
U.S. Appl. No. 15/380,336, Allowed; RCE filed Nov. 21, 2018.
U.S. Appl. No. 15/614,876, Pending.
U.S. Appl. No. 15/626,720, Allowed.
U.S. Appl. No. 15/848,173, Allowed.
U.S. Appl. No. 15/920,768, Allowed; RCE filed.
U.S. Appl. No. 16/009,603, Quayle Action issued (RCE filed).
U.S. Appl. No. 16/100,289, Pending.
U.S. Appl. No. 15/900,106, Pending.
An Office Action dated Nov. 29, 2018, which issued during the prosecution of U.S. Appl. No. 15/380,309.
An Office Action dated Nov. 29, 2018, which issued during the prosecution of U.S. Appl. No. 15/422,821.
Notice of Allowance dated Aug. 6, 2018, which issued during the prosecution of U.S. Appl. No. 15/920,768.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Jul. 3, 2018, which issued during the prosecution of U.S. Appl. No. 15/920,518.
Office Action dated Nov. 28, 2018, which issued during the prosecution of U.S. Appl. No. 15/899,587.
Office Action dated Dec. 25, 2018 in Japanese Application No. 2015-254192.
Office Action dated Dec. 25, 2018 in Japanese Application No. 2015-245144.
Office Action dated Dec. 25, 2018 in Japanese Application No. 2015-245145.
Office Action dated Dec. 31, 2018 in U.S. Appl. No. 16/009,603.
Office Action dated Oct. 5, 2017, which issued during the prosecution of U.S. Appl. No. 15/241,286.
Notice of Allowance dated Mar. 21, 2018, which issued during the prosecution of U.S. Appl. No. 15/241,286.
Office Action dated Oct. 5, 2017, which issued during the prosecution of U.S. Appl. No. 15/241,297.
Office Action dated Oct. 5, 2017, which issued during the prosecution of U.S. Appl. No. 15/241,631.
Office Action dated Oct. 5, 2017, which issued during the prosecution of U.S. Appl. No. 15/378,907.
Notice of Allowance dated Mar. 19, 2018, which issued during the prosecution of U.S. Appl. No. 15/378,907.
Notice of Allowance dated Mar. 27, 2018, which issued during the prosecution of U.S. Appl. No. 15/241,631.
Office Action dated Jan. 27, 2015 from the Japanese Patent Office in Japanese Application No. 2013-053543.
Notice of Allowance dated Mar. 14, 2018, which issued during the prosecution of U.S. Appl. No. 15/854,474.
Office Action dated Sep. 19, 2014, which issued during the prosecution of U.S. Appl. No. 14/209,065.
Office Action dated Mar. 13, 2015, which issued during the prosecution of U.S. Appl. No. 14/209,065.
Office Action dated Jul. 6, 2015, which issued during the prosecution of U.S. Appl. No. 14/209,065.
Office Action dated Sep. 10, 2015, which issued during the prosecution of U.S. Appl. No. 14/209,065.
Office Action dated Mar. 24, 2016, which issued during the prosecution of U.S. Appl. No. 14/209,065.
Notice of Allowance dated Oct. 6, 2016, which issued during the prosecution of U.S. Appl. No. 14/209,065.
Notice of Allowance dated Mar. 21, 2018, which issued during the prosecution of U.S. Appl. No. 15/241,297.
Notice of Allowance dated Jun. 28, 2017, which issued during the prosecution of U.S. Appl. No. 15/464,991.
Office Action dated Nov. 8, 2016 from the Japanese Patent Office in Japanese Application No. 2014-199022.
Office Action dated Feb. 25, 2016, which issued during the prosecution of U.S. Appl. No. 14/867,752.
Office Action dated Oct. 19, 2016, which issued during the prosecution of U.S. Appl. No. 14/867,752.
Office Action dated Mar. 16, 2017, which issued during the prosecution of U.S. Appl. No. 14/867,752.
Office Action dated Sep. 7, 2017, which issued during the prosecution of U.S. Appl. No. 14/867,752.
Office Action dated Jan. 31, 2018, which issued during the prosecution of U.S. Appl. No. 14/867,752.
Notice of Allowance dated Apr. 5, 2018, which issued during the prosecution of U.S. Appl. No. 14/867,752.
Office Action dated Apr. 19, 2018, which issued during the prosecution of U.S. Appl. No. 15/854,438.
Notice of Allowance dated Sep. 24, 2018, which issued during the prosecution of U.S. Appl. No. 15/854,438.
Notice of Allowance dated Jul. 13, 2018, which issued during the prosecution of U.S. Appl. No. 15/920,782.
Notice of Allowance dated Aug. 9, 2018, which issued during the prosecution of U.S. Appl. No. 15/920,563.
Office Action dated Nov. 28, 2018, which issued during the prosecution of U.S. Appl. No. 15/900,144.

(56) References Cited

OTHER PUBLICATIONS

Office Action dated Nov. 28, 2018, which issued during the prosecution of U.S. Appl. No. 15/900,080.
Office Action dated Sep. 28, 2018, which issued during the prosecution of U.S. Appl. No. 15/854,409.
Office Action dated Oct. 15, 2018, which issued during the prosecution of U.S. Appl. No. 15/854,403.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Office Action dated Dec. 20, 2018 in U.S. Appl. No. 15/900,106.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Nov. 14, 2018 in U.S. Appl. No. 16/100,289.
Notice of Allowance, dated Dec. 2, 2016, issued by the U.S. Patent and Trademark Office in U.S. Appl. No. 14/753,227.
Communication dated Nov. 18, 2016 from U.S. Patent & Trademark Office in U.S. Appl. No. 14/753,227.
Final Office Action dated Aug. 15, 2016 from U.S. Patent & Trademark Office in U.S. Appl. No. 14/753,227.
Office Action dated Feb. 4, 2016 from U.S. Patent & Trademark Office in U.S. Appl. No. 14/753,227.
Notice of Allowance dated Jul. 12, 2017, issued by the U.S. Patent and Trademark Office in U.S. Appl. No. 15/388,864.
Communication dated Jun. 9, 2017 from U.S. Patent & Trademark Office in U.S. Appl. No. 15/388,864.
Office Action dated Apr. 26, 2017 from U.S. Patent & Trademark Office in U.S. Appl. No. 15/388,864.
Office Action dated Jun. 7, 2018 from U.S. Patent & Trademark Office in U.S. Appl. No. 15/380,309.
Office Action dated May 2, 2018, which issued during the prosecution of U.S. Appl. No. 15/280,195.
Office Action dated May 4, 2018, which issued during the prosecution of U.S. Appl. No. 15/422,821.
Office Action dated May 4, 2018, which issued during the prosecution of U.S. Appl. No. 15/422,944.
Office Action dated May 4, 2018, which issued during the prosecution of U.S. Appl. No. 15/625,428.
Office Action dated May 7, 2018, which issued during the prosecution of U.S. Appl. No. 15/624,792.
Office Action dated May 7, 2018, which issued during the prosecution of U.S. Appl. No. 15/624,897.
Office Action dated May 7, 2018, which issued during the prosecution of U.S. Appl. No. 15/626,832.
Office Action dated Nov. 16, 2016 which issued during the prosecution of U.S. Appl. No. 15/072,550.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Oct. 15, 2018, which issued during the prosecution of U.S. Appl. No. 15/619,012.
Office Action dated Oct. 22, 2018, which issued during the prosecution of U.S. Appl. No. 15/854,439.
Office Action dated Oct. 3, 2018 from the United States Patent and Trademark Office in U.S. Appl. No. 15/280,195.
Office Action dated Oct. 9, 2018, which issued during the prosecution of U.S. Appl. No. 15/628,814.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Sep. 27, 2018, which issued during the prosecution of U.S. Appl. No. 15/854,383.
Office Action dated Aug. 23, 2018 from the United States Patent and Trademark Office in U.S. Appl. No. 15/614,876.
Office Action dated Aug. 23, 2018 from the United States Patent and Trademark Office in U.S. Appl. No. 15/621,464.
Office Action dated Aug. 23, 2018 from the United States Patent and Trademark Office in U.S. Appl. No. 15/626,720.
Office Action dated Aug. 24, 2018 from the United States Patent and Trademark Office in U.S. Appl. No. 15/620,916.
Office Action dated Aug. 3, 2018 from the United States Patent and Trademark Office in U.S. Appl. No. 15/380,336.
Office Action dated Dec. 5, 2016 from the United States Patent and Trademark Office in U.S. Appl. No. 14/978,834.
Notice of Allowance dated Apr. 25, 2017 which issued during the prosecution of U.S. Appl. No. 15/072,550.
Notice of Allowance dated Apr. 27, 2017, which issued during the prosecution of U.S. Appl. No. 15/052,115.
Notice of Allowance dated Aug. 28, 2018, which issued during the prosecution of U.S. Appl. No. 15/422,821.
Notice of Allowance dated Aug. 30, 2017, which issued during the prosecution of U.S. Appl. No. 15/466,143.
Notice of Allowance dated Jun. 2, 2017, which issued during the prosecution of U.S. Appl. No. 15/218,190.
Notice of Allowance dated Mar. 16, 2018 which issued during the prosecution of U.S. Appl. No. 15/854,410.
Notice of Allowance dated May 10, 2018 which issued during the prosecution of U.S. Appl. No. 15/615,871.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Oct. 11, 2018, which issued during the prosecution of U.S. Appl. No. 15/380,336.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,792.
Notice of Allowance dated Oct. 11, 2018, which issued during the prosecution of U.S. Appl. No. 15/624,897.
Notice of Allowance dated Oct. 12, 2018, which issued during the prosecution of U.S. Appl. No. 15/626,832.
Notice of Allowance dated Sep. 4, 2018, which issued during the prosecution of U.S. Appl. No. 15/625,428.
Office Action dated Jul. 6, 2018, which issued during the prosecution of U.S. Appl. No. 15/848,173.
Office Action dated Aug. 10, 2017, which issued during the prosecution of U.S. Appl. No. 14/870,618.
Notice of Allowance dated Feb. 14, 2018, which issued during the prosecution of U.S. Appl. No. 14/870,618.
Office Action dated Sep. 26, 2017 issued by the Japanese Patent Office in JP Appln. No. 2014-265723 corresponding to U.S. Appl. No. 14/870,618.
Office Action dated Sep. 26, 2017 issued by the Japanese Patent Office in JP Appln. No. 2015-249264 corresponding to U.S. Appl. No. 14/870,618.
Notice of Allowance dated Jul. 16, 2019 in U.S. Appl. No. 15/900,144.
Notice of Allowance dated Jul. 31, 2019 in U.S. Appl. No. 16/100,289.
Notice of Allowance dated Jul. 31, 2019 in U.S. Appl. No. 16/143,646.
Notice of Allowance dated Jun. 25, 2019 in U.S. Appl. No. 15/620,916.
Notice of Allowance dated Jun. 27, 2019 in U.S. Appl. No. 15/854,439.
Notice of Allowance dated Jun. 6, 2019 in U.S. Appl. No. 15/854,383.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/900,230.
Office Action dated Aug. 6, 2019 in Japanese Application No. 2016-254421.

(56) References Cited

OTHER PUBLICATIONS

Office Action dated Aug. 6, 2019 in Japanese Application No. 2016-254427.
Office Action dated Jul. 16, 2019 in Japanese Application No. 2016-124933.
Office Action dated Jun. 10, 2019 in U.S. Appl. No. 15/920,518.
Office Action dated Jun. 25, 2019 in Japanese Application No. 2015-245144.
Office Action dated Jun. 6, 2019 in U.S. Appl. No. 15/899,587.
Office Action dated Aug. 23, 2019 in U.S. Appl. No. 15/854,409.
"Introduction to TMR Magnetic Sensors", Anonymous, Mar. 12, 2015, MR Sensor Technology, pp. 1-5 (Year: 2015).
Notice of Allowance dated Apr. 16, 2019 in U.S. Appl. No. 15/625,428.
Notice of Allowance dated Aug. 27, 2018 in U.S. Appl. No. 15/920,635.
Notice of Allowance dated Mar. 13, 2019 in U.S. Appl. No. 16/100,289.
Notice of Allowance dated Mar. 18, 2019 in U.S. Appl. No. 15/626,355.
Notice of Allowance dated Mar. 18, 2019 in U.S. Appl. No. 15/628,814.
Notice of Allowance dated Mar. 5, 2019 in U.S. Appl. No. 16/009,603.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851.
Office Action dated Apr. 23, 2019 in Japanese Application No. 2016-182230.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018 in U.S. Appl. No. 15/900,242.
Office Action dated Dec. 21, 2018 in U.S. Appl. No. 15/900,160.
Office Action dated Dec. 21, 2018 in U.S. Appl. No. 15/920,616.
Office Action dated Dec. 27, 2018 in U.S. Appl. No. 15/900,334.
Office Action dated Dec. 7, 2018 in U.S. Appl. No. 15/920,592.
Office Action dated Feb. 21, 2019 in U.S. Appl. No. 15/854,383.
Office Action dated Feb. 26, 2019 in Japanese Application No. 2016-123207.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 28, 2019 in U.S. Appl. No. 15/920,518.
Office Action dated Feb. 5, 2019 in U.S. Appl. No. 16/038,339.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated Mar. 5, 2019 in U.S. Appl. No. 15/443,026.
Office Action dated Mar. 6, 2019 in U.S. Appl. No. 15/854,403.
Office Action dated Mar. 7, 2019 in U.S. Appl. No. 15/854,439.
Office Action dated Nov. 19, 2018 in U.S. Appl. No. 15/900,141.
Notice of Allowance dated Apr. 30, 2019 in U.S. Appl. No. 15/380,309.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 7, 2019 in U.S. Appl. No. 15/621,464.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Office Action dated Apr. 4, 2019 in U.S. Appl. No. 16/184,312.
U.S. Appl. No. 15/854,438, Allowed.
U.S. Appl. No. 15/854,409, Allowed.
U.S. Appl. No. 15/920,563, Allowed.
U.S. Appl. No. 15/920,533, Pending.
U.S. Appl. No. 15/900,144, Pending.
U.S. Appl. No. 15/900,080, Pending.
U.S. Appl. No. 15/900,230, Pending.
U.S. Appl. No. 15/900,164, Allowed.
U.S. Appl. No. 15/920,518, Pending.
U.S. Appl. No. 15/899,430, Allowed.
U.S. Appl. No. 15/920,515, Allowed.
U.S. Appl. No. 15/920,517, Allowed.
U.S. Appl. No. 15/920,538, Allowed.
U.S. Appl. No. 15/920,544, Allowed.
U.S. Appl. No. 15/920,768, Allowed.
U.S. Appl. No. 16/009,603, Allowed.
U.S. Appl. No. 16/182,083, Pending (Continuation of U.S. Appl. No. 15/920,768).
U.S. Appl. No. 16/232,165, Pending (Continuation of U.S. Appl. No. 15/854,438).
U.S. Appl. No. 15/900,141, Pending.
U.S. Appl. No. 15/900,160, Pending.
U.S. Appl. No. 15/900,345, Pending.
U.S. Appl. No. 15/900,379, Allowed.
U.S. Appl. No. 15/920,616, Pending.
U.S. Appl. No. 15/900,334, Pending.
U.S. Appl. No. 15/920,592, Pending.
U.S. Appl. No. 16/160,377, Pending.
U.S. Appl. No. 16/038,339, Allowed.
U.S. Appl. No. 16/184,312, Pending.
U.S. Appl. No. 16/143,646, Pending.
U.S. Appl. No. 15/422,821, Allowed.
U.S. Appl. No. 15/625,428, Allowed.
U.S. Appl. No. 15/614,876, Allowed.
U.S. Appl. No. 15/621,464, Allowed.
U.S. Appl. No. 15/848,173, Allowed; QPIDS filed.
U.S. Appl. No. 15/380,309, Allowed.
U.S. Appl. No. 15/854,409, Allowed; QPIDS filed.
U.S. Appl. No. 15/900,230, Allowed.
U.S. Appl. No. 15/900,141, Allowed.
U.S. Appl. No. 15/900,345, Allowed.
U.S. Appl. No. 15/920,592, Allowed.
Notice of Allowance dated Mar. 14, 2018 in U.S. Appl. No. 15/854,329.
Office Action dated Aug. 25, 2017 in U.S. Appl. No. 14/838,663.
Office Action dated Aug. 27, 2019 in Japanese Application No. 2016-254428.
Office Action dated Aug. 27, 2019 in Japanese Application No. 2016-254430.

(56) References Cited

OTHER PUBLICATIONS

Office Action dated Aug. 27, 2019 in Japanese Application No. 2016-254432.
Office Action dated Aug. 28, 2019 in U.S. Appl. No. 15/854,397.
Office Action dated Feb. 11, 2016 in U.S. Appl. No. 14/838,663.
Office Action dated Mar. 15, 2018 in U.S. Appl. No. 14/838,663.
Office Action dated Mar. 30, 2017 in U.S. Appl. No. 14/838,663.
Office Action dated Mar. 5, 2019 in U.S. Appl. No. 15/854,397.
Office Action dated Oct. 1, 2019 in Japanese Application No. 2017-029493.
Office Action dated Oct. 1, 2019 in Japanese Application No. 2017-029494.
Office Action dateed Oct. 1, 2019 in Japanese Application No. 2017-029495.
Office Action dated Oct. 12, 2018 in U.S. Appl. No. 15/854,397.
Office Action dated Oct. 2, 2019 in U.S. Appl. No. 15/443,094.
Office Action dated Sep. 12, 2016 in U.S. Appl. No. 14/838,663.
Office Action dated Sep. 16, 2019 in U.S. Appl. No. 15/854,403.
Office Action dated Sep. 17, 2019 in Japanese Application No. 2017-029499.
Office Action dated Sep. 19, 2019 in U.S. Appl. No. 15/443,026.
Office Action dated Sep. 20, 2019 in U.S. Appl. No. 15/442,961.
Office Action dated Sep. 24, 2019 in Japanese Application No. 2016-254436.
Office Action dated Sep. 24, 2019 in Japanese Application No. 2016-254439.
Office Action dated Sep. 24, 2019 in Japanese Application No. 2016-254441.
Office Action dated Sep. 24, 2019 in Japanese Application No. 2016-254450.
Office Action dated Sep. 24, 2019 in Japanese Application No. 2017-029491.
Office Action dated Sep. 24, 2019 in Japanese Application No. 2017-029508.
Office Action dated Sep. 24, 2019 in Japanese Application No. 2017-065730.
Office Action dated Sep. 3, 2019 in Japanese Application No. 2016-254434.
Advisory Action dated Jul. 5, 2018 in U.S. Appl. No. 14/838,663.
U.S. Appl. No. 15/052,115, Patented as U.S. Pat. No. 9,704,527.
U.S. Appl. No. 15/218,190, Patented as U.S. Pat. No. 9,721,606.
U.S. Appl. No. 15/280,195, Allowed.
U.S. Appl. No. 15/422,821, Allowed; QPIDS filed.
U.S. Appl. No. 15/422,944, Patented as U.S. Pat. No. 10,347,279.
U.S. Appl. No. 15/466,143, Patented as U.S. Pat. No. 9,837,116.
U.S. Appl. No. 15/619,012, Allowed.
U.S. Appl. No. 15/624,897, Allowed.
U.S. Appl. No. 15/624,792, Allowed.
U.S. Appl. No. 15/626,832, Allowed.
U.S. Appl. No. 15/625,428, Patented as U.S. Pat. No. 10,403,318.
U.S. Appl. No. 14/978,834, Patented as U.S. Pat. No. 9,721,605.
U.S. Appl. No. 14/757,555, Patented as U.S. Pat. No. 9,711,174.
U.S. Appl. No. 15/197,046, Patented as U.S. Pat. No. 9,721,607.
U.S. Appl. No. 15/380,336, Allowed.
U.S. Appl. No. 15/614,876, Patented as U.S. Pat. No. 10,431,248.
U.S. Appl. No. 15/620,916, Allowed.
U.S. Appl. No. 15/621,464, Patented as U.S. Pat. No. 10,431,249.
U.S. Appl. No. 15/626,720, Patented as U.S. Pat. No. 10,347,280.
U.S. Appl. No. 15/854,383, Allowed.
U.S. Appl. No. 15/854,507, Patented as U.S. Pat. No. 9,984,716.
U.S. Appl. No. 15/854,439, Allowed.
U.S. Appl. No. 15/854,506, Patented as U.S. Pat. No. 10,008,230.
U.S. Appl. No. 15/848,173, Patented as U.S. Pat. No. 10,403,320.
U.S. Appl. No. 15/628,814, Allowed.
U.S. Appl. No. 15/690,400, Allowed.
U.S. Appl. No. 15/690,906, Allowed.
U.S. Appl. No. 15/626,355, Allowed.
U.S. Appl. No. 15/627,696, Allowed.
U.S. Appl. No. 14/870,618, Patented as U.S. Pat. No. 9,959,894.
U.S. Appl. No. 14/753,227, Patented as U.S. Pat. No. 9,601,146.
U.S. Appl. No. 15/380,309, Patented as U.S. Pat. No. 10,403,319.
U.S. Appl. No. 15/388,864, Patented as U.S. Pat. No. 9,773,519.
U.S. Appl. No. 15/072,550, Patented as U.S. Pat. No. 9,704,525.
U.S. Appl. No. 15/615,871, Patented as U.S. Pat. No. 10,074,393.
U.S. Appl. No. 15/854,410, Patented as U.S. Pat. No. 9,972,351.
U.S. Appl. No. 15/378,907, Patented as U.S. Pat. No. 9,984,710.
U.S. Appl. No. 15/241,631, Patented as U.S. Pat. No. 10,026,435.
U.S. Appl. No. 14/209,065, Patented as U.S. Pat. No. 9,530,444.
U.S. Appl. No. 15/854,474, Patented as U.S. Pat. No. 9,978,414.
U.S. Appl. No. 15/854,403, Pending.
U.S. Appl. No. 15/241,297, Patented as U.S. Pat. No. 10,026,434.
U.S. Appl. No. 15/241,286, Patented as U.S. Pat. No. 10,026,433.
U.S. Appl. No. 15/464,991, Patented as U.S. Pat. No. 9,779,772.
U.S. Appl. No. 14/867,752, Patented as U.S. Pat. No. 10,026,430.
U.S. Appl. No. 15/854,438, Patented as U.S. Pat. No. 10,373,633.
U.S. Appl. No. 15/854,409, Pending.
U.S. Appl. No. 15/443,026, Pending.
U.S. Appl. No. 15/920,782, Patented as U.S. Pat. No. 10,134,433.
U.S. Appl. No. 15/920,563, Allowed; QPIDS filed.
U.S. Appl. No. 15/920,533, Patented as U.S. Pat. No. 10,431,251.
U.S. Appl. No. 15/900,144, Allowed.
U.S. Appl. No. 15/900,080, Allowed.
U.S. Appl. No. 15/900,230, Patented as U.S. Pat. No. 10,431,250.
U.S. Appl. No. 15/900,164, Patented as U.S. Pat. No. 10,424,330.
U.S. Appl. No. 15/920,518, Allowed.
U.S. Appl. No. 15/899,587, Pending.
U.S. Appl. No. 15/899,430, Patented as U.S. Pat. No. 10,403,314.
U.S. Appl. No. 15/920,515, Patented as U.S. Pat. No. 10,410,665.
U.S. Appl. No. 15/920,517, Patented as U.S. Pat. No. 10,395,685.
U.S. Appl. No. 15/920,538, Patented as U.S. Pat. No. 10,403,317.
U.S. Appl. No. 15/920,544, Patented as U.S. Pat. No. 10,410,666.
U.S. Appl. No. 15/920,768, Patented as U.S. Pat. No. 10,373,639.
U.S. Appl. No. 16/009,603, Patented as U.S. Pat. No. 10,366,721.
U.S. Appl. No. 16/182,083, Allowed (Continuation of U.S. Appl. No. 15/920,768).
U.S. Appl. No. 15/705,531, Pending.
U.S. Appl. No. 16/232,165, Allowed (Continuation of U.S. Appl. No. 15/854,438).
U.S. Appl. No. 16/100,289, Allowed.
U.S. Appl. No. 16/038,669, Pending.
U.S. Appl. No. 15/900,106, Allowed.
U.S. Appl. No. 15/900,412, Patented as U.S. Pat. No. 10,062,403.
U.S. Appl. No. 15/900,141, Allowed; RCE filed.
U.S. Appl. No. 15/900,160, Allowed.
U.S. Appl. No. 15/900,345, Allowed; QPIDS filed.
U.S. Appl. No. 15/900,379, Allowed; QPIDS filed.
U.S. Appl. No. 16/012,018, Pending.
U.S. Appl. No. 15/920,616, Allowed.
U.S. Appl. No. 15/900,242, Allowed.
U.S. Appl. No. 15/900,334, Allowed.
U.S. Appl. No. 15/920,592, Patented as U.S. Pat. No. 10,403,312.
U.S. Appl. No. 15/920,635, Patented as U.S. Pat. No. 10,170,144.
U.S. Appl. No. 16/160,377, Allowed.
U.S. Appl. No. 15/443,094, Pending.
U.S. Appl. No. 15/442,961, Pending.
U.S. Appl. No. 16/038,687, Pending.
U.S. Appl. No. 16/038,514, Pending.
U.S. Appl. No. 16/038,545, Pending.
U.S. Appl. No. 16/037,596, Pending.
U.S. Appl. No. 16/038,771, Pending.
U.S. Appl. No. 16/037,564, Pending.
U.S. Appl. No. 16/038,339, Patented as U.S. Pat. No. 10,403,316.
U.S. Appl. No. 16/037,573, Pending.
U.S. Appl. No. 16/037,681, Pending.
U.S. Appl. No. 16/038,884, Pending.
U.S. Appl. No. 16/038,847, Pending.
U.S. Appl. No. 16/044,574, Allowed.
U.S. Appl. No. 16/142,560, Pending.
U.S. Appl. No. 16/184,312, Allowed.
U.S. Appl. No. 16/143,646, Allowed.
U.S. Appl. No. 16/144,428, Pending.
U.S. Appl. No. 16/143,747, Pending.
U.S. Appl. No. 16/440,161, Pending.

(56) References Cited

OTHER PUBLICATIONS

U.S. Appl. No. 16/144,605, Pending.
U.S. Appl. No. 15/854,397, Pending.
U.S. Appl. No. 15/854,329, Patented as U.S. Pat. No. 9,984,712.
U.S. Appl. No. 14/838,663, Abandoned.

* cited by examiner

MAGNETIC TAPE AND METHOD OF MANUFACTURING THE SAME

CROSS-REFERENCE TO RELATED APPLICATIONS

This application claims priority under 35 U.S.C. 119 to Japanese Patent Application No. 2015-254186 filed on Dec. 25, 2015. The above application is hereby expressly incorporated by reference, in its entirety.

BACKGROUND OF THE INVENTION

Field of the Invention

The present invention relates to a magnetic tape and a method of manufacturing the same.

Discussion of the Background

Magnetic recording media include tape-shaped media and disk-shaped media. Magnetic recording media in the form of tapes, that is, magnetic tapes, are primarily employed in storage applications such as data; backup tapes. As described in Japanese Unexamined Patent Publication (KOKAI) No. 2012-38367, paragraphs 0035 and 0038, for example, a structure in which a nonmagnetic layer (referred to as a nonmagnetic underlayer in Japanese Unexamined Patent Publication (KOKAI) No, 2012-38367) is provided between a nonmagnetic support and a magnetic layer (referred to hereinafter as a "multilayer structure") is currently the mainstream layer structure in magnetic tapes. The content of the above publication is expressly incorporated herein by reference in its entirety.

The recording and/or reproduction of a signal on a magnetic tape is normally conducted by running the magnetic tape within a drive to bring the surface of the magnetic tape (magnetic layer surface) and a magnetic head into (sliding) contact. Reducing the size of the particles constituting the ferromagnetic powder contained in the magnetic layer permits noise reduction when reproducing a signal that has been recorded on a magnetic tape. As a result, the electromagnetic characteristics (signal-to-noise ratio (SNR)) can be e this regard, from the perspective of reducing noise, Japanese Unexamined Patent Publication (KOKAI) No. 2012-38367, paragraph 0024, describes for example reducing the average plate diameter of ferromagnetic hexagonal ferrite powder (referred to in Japanese Unexamined Patent Publication (KOKAI) No. 2012-38367 as hexagonal ferrite magnetic powder) to less than or equal to 30 nm.

SUMMARY OF THE INVENTION

Examples of the ferromagnetic powder that is employed in the magnetic layer are various ferromagnetic powders such as ferromagnetic hexagonal ferrite powder and ferromagnetic metal powder. Of these, ferromagnetic hexagonal ferrite powder is considered to be desirable ferromagnetic powder from the perspective of achieving good magnetic characteristics even at reduced particle size.

Magnetic tapes that are used in data storage applications are often employed in low temperature and low humidity environments (for example, in environments with temperatures of 10° C. to 15° C. and a relative humidity of about 10% to 20%) with temperature and humidity control, such as in data centers with regulated temperature and humidity. However, from the perspective of reducing air conditioning cost for the temperature and humidity control, it is desirable to relax or omit the temperature and humidity control of the environment in which magnetic tapes are storaged.

In view of the above, the present inventors conducted research to reduce the particle size of the ferromagnetic hexagonal ferrite for the improvement of SNR in magnetic tapes with multilayer structure as well as to relax or omit the temperature and humidity control of the environment in which magnetic tapes are storaged. As a result, it was found that rise in coefficient of friction occurred when the magnetic tape with multilayer structure which contained hexagonal ferrite magnetic powder with reduced particle size for the improvement of SNR in the magnetic layer run in a drive after storage in an environment (referred to as "high-temperature and high humidity-environment", hereinafter) in which temperature and humidity control was relaxed or omitted; that was not known. The above high-temperature and high humidity environment is, for example, the environment in which the temperature is equal to or higher than 30° C. and the relative humidity is equal to or higher than 50%. It is desirable to suppress the rise in coefficient of friction because increased coefficient of friction causes deteriorated running characteristics such as running stability, running durability and the like of magnetic tape.

As set forth above, in magnetic tapes with multilayer structure, it was conventionally difficult to achieve both improvement of electromagnetic characteristics (SNR) and suppression of increased coefficient of friction a. in a drive after storage in high-temperature and high-humidity environment (simply referred to as "coefficient of friction after storage", hereinafter).

An aspect of the present invention provides for a magnetic tape with multilayer structure that can exhibit good electromagnetic characteristics and in which rise in coefficient of friction can be suppressed after storage in high-temperature and high-humidity environment, An aspect of the present invention relates to the following magnetic tape:

a magnetic tape having a nonmagnetic layer containing nonmagnetic powder and binder on a nonmagnetic support and a magnetic layer containing ferromagnetic powder and binder on the nonmagnetic layer, wherein a fatty acid ester is contained in at least the magnetic layer;

the ferromagnetic powder is ferromagnetic hexagonal ferrite powder;

the ferromagnetic hexagonal ferrite powder has a crystallite volume as determined by X-ray diffraction analysis ranges from 1,000 $nm^3$ to 2,400 $nm^3$, and a ratio of the crystallite size $D_{x(107)}$ obtained from a diffraction peak of a (107) plane to a particle size in a direction of an easy axis of magnetization $D_{TEM}$ as determined by observation with a transmission electron microscope, $D_{x(107)}/D_{TEM}$, is greater than or equal to 1.1; and ΔSFD in a longitudinal direction of the magnetic tape as calculated with Equation 1 ranges from 0.50 to 1.60:

Equation 1

$$\Delta SFD = SFD_{25°\ C.} - SFD_{-190°\ C.}$$

In Equation 1, $SFD_{25°\ C.}$ denotes a switching field distribution SFD as measured in the longitudinal direction of the magnetic tape in an environment with a temperature of 25° C., and $SFD_{-190°\ C.}$ denotes a switching field distribution SFD as measured in the longitudinal direction of the magnetic tape in an environment with a temperature of −190° C. The SFD in the longitudinal direction of the magnetic tape can be measured with a known magnetic characteristic measuring apparatus, such as a vibrating sample magnetometer. The same applies to measurement of the SFD of ferromagnetic powder described below. The temperature during SFD measurement can be adjusted by setting the measuring apparatus.

The shape of the particles constituting the ferromagnetic hexagonal ferrite powder is specified by removing powder from the magnetic layer, imaging it at 100,000-fold magnification under a transmission electron microscope, printing the image on photographic paper at a total magnification of 500,000-fold to obtain a particle photograph, and tracing the contours of the particles (primary particles) with a digitizer. The ferromagnetic hexagonal ferrite particles can be removed from the magnetic layer by, for example, the method described in Examples further below. However, any method of removing the powder from the magnetic layer will suffice; there is no limitation to the method described in Examples. The term "primary particles" refers to independent particles that have not aggregated, The imaging by a transmission electron microscope is conducted by a direct method employing transmission electron microscopic observation at an acceleration voltage of 300 kV. The observation and measurement by a transmission electron microscope in Examples described further below was conducted with a model H-9000 transmission electron microscope made by Hitachi and KS-400 image analysis software produced by Carl Zeiss.

The term "plate-like" in reference to the shape of the particles constituting the ferromagnetic hexagonal ferrite powder refers to a shape presenting two opposing plate surfaces. Shapes in which it is possible to distinguish a major axis and a minor axis are "elliptical," and are among those particle shapes that do not have such plate surfaces. The "major axis" is determined as the axis (straight line) of the greatest length passing through a particle. The minor axis is determined as the axis of the greatest length that perpendicularly intersects the major axis and passes through the particle. Shapes in which there is no distinction between major axis and minor axis, such as shapes where the major axis minor axis, are "spherical". Shapes for which it is impossible to specify a major axis and minor axis will be referred to as "indeterminate" hereinafter.

The above particle size in the direction of the easy axis of magnetization $D_{TEM}$ is the size that is measured for primary particles. For a plate-like particle, it is the plate thickness of the primary particle. For an elliptical particle, it is the minor axis length of the primary particle. For a spherical particle, it is the diameter of the primary particle. These particle sizes are the primary particle sizes in the direction of the c-axis, which is the direction of the easy axis of magnetization of particles of ferromagnetic hexagonal ferrite powder.

The imaging by a transmission electron microscope to determine the above particle shape can be conducted without orientation processing the powder to be imaged. By contrast, during imaging by a transmission electron microscope to measure $D_{TEM}$, the powder to be imaged is subjected to orientation processing in a horizontal direction (a direction parallel to the horizontal plane), after which a photograph of the particles is taken by a transmission electron microscope under the same conditions and by the same method as set forth above. The magnetic strength, size, and the like of the magnets employed in orientation processing are not limited. An example of orientation processing will be given further below in Examples. By implementing orientation processing in a horizontal direction, the direction of the easy axis of magnetization of the particles constituting the ferromagnetic hexagonal ferrite powder aligns with the horizontal direction relative to the sample stage within the transmission electron microscope. Thus, the particle size in the direction of the easy axis of magnetization (direction of the c-axis) can be obtained from the particle photograph., In describing angles such as horizontal and parallel, they are to be construed as falling with the range of error that is permitted in the technical field to which the present invention belongs. For example, this means falling with a range of less than ±10° of the exact angle. The error with the exact angle is desirably less than or equal to 5°, and preferably less than or equal to 3°. The particle size in the direction of the easy axis of magnetization $D_{TEM}$ is obtained by tracing the contours as set forth above of 500 particles randomly extracted from a photograph of the particles, and taking the arithmetic average of the particle sizes obtained with image analysis software (for example, Carl Zeiss KS-400 image analysis software). The plate thickness refers to the shortest distance between the two plate surfaces. The particle size $D_{TEM}$ for particles that are neither plate-like, elliptical, nor spherical (indeterminate) is defined as the equivalent circle diameter. The equivalent circle diameter refers to the diameter of a circle having the same area as the area within the contours traced in the above photograph of the particles.

In the present invention and specification, the term "powder" means an aggregation of multiple particles. The number of crystallites contained in the particles is greater than or equal to 1. It can be 1 or greater than or equal to 2. Desirably, the number of crystallites contained in a single particle (primary particle) is 1. The term "aggregation of multiple particles" is not limited to forms in which the particles constituting the aggregation are in direct contact; it can include forms in which the binder, additives, and the like that are set forth further below are present between the individual particles. The term "particles" will sometimes be used to denote powder hereinafter.

X-ray diffraction analysis of the ferromagnetic hexagonal ferrite powder is conducted with a test specimen (normally, recovered in a powder state) obtained by scraping off part or all of the magnetic layer of a magnetic recording medium with some means of separation, such as a blade. The test specimen may also contain components other than ferromagnetic hexagonal ferrite powder. However, it is still possible to detect the specific diffraction peak of hexagonal ferrite when such components are contained. The quantity of test specimen that is used in X-ray diffraction analysis is, for example, 0.001 g to 1 g. The quantity need only be adequate to obtain the diffraction peak of the (110) plane and (107) plane of hexagonal ferrite, described further below.

X-ray diffraction analysis is conducted with a powder X-ray diffraction measuring device (such as an RINT 2500 made by Rigaku Corp.) under the following conditions.

Employing a Cu Radiation Source (Output 55 kV, 280 mA)

Scan Conditions: 0.05 Degree/Step, 3 Degrees/Min Over a Range of 10 Degrees to 70 Degrees In the X-ray diffraction spectrum obtained under the above conditions, the crystallite sizes of the respective diffraction surfaces are calculated by the Scherrer equation from the diffraction line widths (full width at half maximum) of the (110) plane and (107) plane of hexagonal ferrite. The Scherrer equation is given below.

<Scherrer Equation>

Crystallite size (angstrom; Å)=$K \times \lambda/(\beta \times \cos \theta)$

K: Scherrer constant $\lambda$: Wavelength (Å of the X-ray tube employed $\beta$: Diffraction line width (full width at half maximum) [radians]

$\theta$: Diffraction angle $2\theta/\theta$ [radians]

The crystallite size $D_{x(110)}$ obtained from the diffraction peak of the (110) plane and the crystallite size $D_{x(107)}$ obtained from the diffraction peak of the (107) plane are calculated with the Scherrer equation. Since the crystallite size is calculated in units of Å in the Scherrer equation, the calculated value is converted to units of μm for use. 1 Å=0.1 nm.

Among the diffraction planes, the (107) plane is positioned in the vicinity of the direction of the easy axis of magnetization (c-axis direction). Accordingly, the crystallite size $D_{x(107)}$ that is obtained from the diffraction peak of the (107) plane can be viewed as being the crystallite size in the direction of the easy axis of magnetization (c-axis direction) obtained by X-ray diffraction analysis of the crystallites of ferromagnetic hexagonal ferrite powder. That is, it can be viewed as the plate thickness of the crystallites obtained by X-ray diffraction analysis when the shape is plate-like, the minor axis length when the shape is elliptical, and the diameter when the shape is spherical.

The (110) plane is positioned orthogonally with respect to the direction of the easy axis of magnetization. Accordingly, the crystallite size $D_{x(110)}$ that is obtained from the diffraction peak of the (110) plane can be viewed as being the plate diameter of the crystallites obtained by X-ray diffraction analysis when the shape is plate-like, the major axis length when the shape is elliptical, and the diameter when the shape is spherical.

For a plate-like shape, the shape of the crystallites can be viewed as being that of a regular hexagonal prism. The crystallite volume obtained by X-ray diffraction analysis is calculated based on the equation for calculating the volume of a regular hexagonal prism:

Crystallite volume $(nm^3) = (3\sqrt{3}\, D_{x(110)}^2 \times D_{x(107)})/8$

For elliptical and spherical shapes, the crystallite volume as determined by X-ray diffraction analysis is calculated based on the equation for calculating the volume of an ellipsoid or sphere:

Crystallite volume $(nm^3) = \pi D_{x(110)}^2 \times D_{x(107)}/6$

For indeterminate shapes, in the same manner as for elliptical and spherical shapes, the crystallite volume is obtained by X-ray diffraction analysis as:

Crystallite volume $(nm^3) = (\pi D_{x(107)}^2 \times D_{x(107)})/6$.

The present inventors conducted extensive research into the ΔSTD, the $D_{TEM}$ of the crystallite size in the direction of the easy axis of magnetization that is obtained by observation with a transmission electron microscope as set forth above and the various values obtained by X-ray diffraction analysis. That resulted in the discovery of the following points; the magnetic tape according to an aspect of the present invention was devised on that basis, However, the following are merely presumptions by the present inventors. The present invention is not limited in any way by these presumptions.

A magnetic tape containing ferromagnetic hexagonal ferrite powder with a crystallite volume falling within a range of 1,000 $nm^3$ to 2,400 $nm^3$ as ferromagnetic powder in the magnetic layer can afford good electromagnetic characteristics (SNR). This is presumed to be because it is able to reduce noise, as set forth above.

With regard to the rise in coefficient of friction after storage in high-temperature and high-humidity environment, the present inventors presume that it occurs due to that supply of lubricant from the nonmagnetic layer to the magnetic layer becomes difficult after storage in such environment. This point will be described in detail below.

In magnetic tapes with multilayer structure in which the nonmagnetic layer is provided between the nonmagnetic support and the magnetic layer, the magnetic layer is said that it can function as a tank which supplies lubricant to the magnetic layer. However, after storage in high-temperature and high-humidity environment, although the reason thereof is not clear, supply (move) of lubricant from the nonmagnetic layer to the magnetic layer becomes difficult. Lubricant can reduce the coefficient of friction by being contained in the magnetic layer, Therefore, the present inventors presume that insufficient supply of lubricant would cause rise in coefficient of friction after storage in high-temperature and high-humidity environment.

Therefore, the present inventors conducted extensive research in that reduced amount of fatty acid ester that is supplied from the nonmagnetic layer to the magnetic layer is compensate by promoting supply of fatty acid ester from the interior of the magnetic layer to the surface of the magnetic layer, The reason why they focused on fatty acid ester among various types of lubricant is that fatty acid is said that it can contribute to reduction in coefficient of friction by forming liquid film of fatty acid ester on the surface of the magnetic layer. Details thereof will be described further below. As a result of extensive research, the present inventors reached that the $D_{x(107)}/D_{TEM}$ and ΔSFD were set to the above ranges. This point will be further described below.

With regard to the $D_{x(107)}/D_{TEM}$, the ratio of the $D_{x(107)}$ to the particle size in a. direction of an. easy axis of magnetization $D_{TEM}$ as determined by observation with a transmission electron microscope, the present inventors presume as follows.

The present inventors presume that $D_{x(107)}$ assumes a lower value as the strains in rile crystalline structure of hexagonal ferrite increase. Additionally, the strains in the crystalline structure are presumed not to affect the size that is measured by a transmission electron microscope—that is, $D_{TEM}$—which is the physical size. Accordingly, the present inventors presume that the higher the ratio of $D_{x(107)}$ relative to $D_{TEM}$, the smaller the number of strains in the crystalline structure of hexagonal ferrite that is indicated. The present inventors also presume the following matters. Ferromagnetic hexagonal ferrite magnetic powder with small number of strains with the $D_{x(107)}/D_{TEM}$ of greater than or equal to 1.1 tends not to adsorb fatty acid ester. Thus, the liquid film of fatty acid ester sufficient to suppression of rise in coefficient of friction can be formed on the surface of the magnetic layer without inhibition of move fatty acid ester from the interior of the magnetic layer to the magnetic layer surface. This can contribute to suppression of rise in coefficient of friction after storage in high-temperature and high-humidity environment.

In addition, with regard to move fatty acid ester to the magnetic layer surface, the present inventors presume that the orientation state of the ferromagnetic hexagonal ferrite powder in the magnetic layer affects the amount of fatty acid ester which moves from the interior of the magnetic layer to the magnetic layer surface. Specifically, the present inventors presume as follows. Movement of fatty acid ester from the interior to the surface of the magnetic layer tends to be promoted when the degree of alignment of ferromagnetic hexagonal ferrite powder in a longitudinal direction of the magnetic layer is higher, and movement of fatty acid ester from the interior to the surface of the magnetic layer tends to be inhibited when alignment of ferromagnetic hexagonal ferrite powder in a longitudinal direction of the magnetic layer is random. In this regard, according to the investigation by the present inventors, the more random the alignment of ferromagnetic hexagonal ferrite powder in a longitudinal direction of the magnetic layer is, the greater the ΔSFD tends to be, and the higher the degree of alignment of ferromagnetic hexagonal ferrite powder in a longitudinal direction of the magnetic layer is, the lower the ΔSFD tends to be, Therefore, the present inventors presume that the amount of fatty acid ester moving from the interior to the surface of the magnetic layer decreases with higher ΔSFD, and the amount of fatty acid ester moving from the interior to the surface of the magnetic layer increases with lower ΔSFD. Thus, the present inventors presume that, in the magnetic layer with the ΔSH) ranging from 0.50 to 1.60, the ferromagnetic hexagonal ferrite powder is present in a state which can yield supply of sufficient amount of fatty acid ester from the interior to the surface of the magnetic layer to achieve suppression of rise in coefficient of friction after the storage. This is assumed by the present inventors to contribute to the formation of liquid film of fatty acid ester that can suppress rise in coefficient of friction after the storage in high-temperature and high-humidity environment.

As described above, the present inventors presume that suppression of rise in coefficient of friction after the storage in high-temperature and high-humidity environment becomes possible by compensating the reduced amount of fatty acid ester supplied from the nonmagnetic layer to the magnetic layer after the storage in high-temperature and high-humidity environment with promoted supply of fatty acid ester from the interior to the surface of the magnetic layer. However, these are merely presumptions, and are not intended to limit the present invention in any way.

In one embodiment, the $D_{x(107)}/D_{TEM}$ of the ferromagnetic hexagonal ferrite powder falls within a range of 1.1 to 1.5.

In one embodiment, the crystallite volume as determined by X-ray diffraction of the ferromagnetic hexagonal ferrite powder falls within a range of 1,000 nm$^3$ to 1,500 nm$^3$.

In one embodiment, the ΔSFD fails within a range of 0.50 to 1.00.

A further aspect of the present invention relates to a method of manufacturing the above magnetic tape, including:

forming a magnetic layer through preparation of a magnetic layer-forming composition and coating of the magnetic layer-forming composition that has been prepared on a nonmagnetic layer that has been formed on a nonmagnetic support, wherein the preparation of the magnetic layer-forming composition includes:

a first stage of dispersing ferromagnetic hexagonal ferrite powder, binder, and solvent in the presence of first dispersion beads to obtain a dispersion, and a second stage of dispersing the dispersion obtained in the first stage in the presence of second dispersion beads of smaller bead diameter and lower density than the first dispersion beads.

The present inventors presume that by dispersing a dispersion containing ferromagnetic hexagonal ferrite powder in two dispersion stages as set forth above, it is possible to inhibit the generation of strain within the crystalline structure of the ferromagnetic hexagonal ferrite powder. More specifically, the present inventors presume that the fact that less energy can be applied to the particles of ferromagnetic hexagonal ferrite powder in the dispersion treatment by using second dispersion beads in the form of beads of smaller bead diameter and lower density than the first dispersion beads can contribute to inhibiting the generation of strain. However, this is merely a presumption and is not intended to limit the present invention in any way. The magnetic tape according to one aspect of the present invention is not limited to being manufactured by the above manufacturing method.

In one embodiment, the second stage is conducted in the presence of a quantity of second dispersion beads that is greater than or equal to 10-fold the quantity of ferromagnetic hexagonal ferrite powder based on weight.

In one embodiment, the head diameter of the second dispersion heads is less than or equal to 1/100 the bead diameter of the first dispersion beads.

In one embodiment, the bead diameter of the second dispersion beads falls within a range of 80 nm to 1,000 nm.

In one embodiment, the density of the second dispersion heads is less than or equal to 3.7 g/cm$^3$.

In one embodiment, the second dispersion beads are diamond beads.

In one embodiment, the first stage is a step of obtaining a liquid dispersion by dispersion processing solvent, binder, and ferromagnetic hexagonal ferrite powder having a $\Delta SFD_{powder}$ as calculated by Equation 2 that falls within a range of 0.05 to 1.90:

Equation 2

$$\Delta SFD_{powder} = SFD_{powder 100° C.} - SFD_{powder 25° C.}$$

in the presence of first dispersion beads. In Equation 2, $SFD_{power 100° C.}$ denotes the switching field distribution STD of the ferromagnetic hexagonal ferrite powder as measured in an environment with a temperature of 100° C., and $SFD_{powder 25° C.}$ denotes the switching field distribution STD of the ferromagnetic hexagonal ferrite powder as measured in an environment with a temperature of 25° C.

An aspect of the present invention can provide a magnetic tape that can exhibit electromagnetic characteristics and in which increase in the coefficient of friction can be inhibited during running in a drive after storage in high-temperature and high-humidity environment, as well as a method of manufacturing such a magnetic tape.

Other exemplary embodiments and advantages of the present invention may he ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the multiple reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to he considered as an attempt to limit the application of the doctrine of equivalents to the scope of the claims, each numerical parameter should he construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

Magnetic Tape

An aspect of the present invention relates to:

a magnetic tape having a nonmagnetic layer containing nonmagnetic powder and binder on a nonmagnetic support and a magnetic layer containing ferromagnetic powder and binder on the nonmagnetic layer, wherein a fatty acid ester is contained in at least the magnetic layer;

the ferromagnetic powder is ferromagnetic hexagonal ferrite powder;

the ferromagnetic hexagonal ferrite powder has a crystallite volume as determined by X-ray diffraction analysis ranges from 1,000 nm³ to 2,400 nm³, and a ratio of the crystallite size $D_{x(107)}$ obtained from a diffraction peak of a (107) plane to a particle size in a direction of an easy axis of magnetization $D_{TEM}$ as determined by observation with a transmission electron microscope, $D_{x(107)}/D_{TEM}$, is greater than or equal to 1.1; and ΔSFD in a longitudinal direction of the magnetic tape as calculated with Equation 1 described above ranges from 0.50 to 1.60.

The above magnetic tape will be described in greater detail. Unless specifically stated otherwise, the magnetic characteristic when no measurement temperature is given is a value measured in an environment with a temperature of 25° C.

<Crystallite Volume as Determined by X-Ray Diffraction Analysis>

The crystallite volume (referred to hereinafter as $V_{XRD}$) that is determined by X-ray diffraction analysis (XRD) of the ferromagnetic hexagonal ferrite powder contained in the magnetic layer of the above magnetic tape is measured by the method set forth above. The present inventors presume that being the $V_{XRD}$ of the ferromagnetic hexagonal ferrite powder contained in the magnetic layer to less than or equal to 2,400 nm³ can contribute to raising the SNR by reducing noise. Investigation by the present inventors has revealed that a $V_{XRD}$ of greater than or equal to 1,000 nm³ could contribute to achieving a good SNR. Accordingly, the $V_{XRD}$ of the ferromagnetic hexagonal ferrite powder contained in the magnetic layer of the above magnetic tape is set to within a range of 1,000 nm³ to 2,400³. From the perspective of further raising the SNR, the $V_{XRD}$ desirably falls within a range of 1,000 nm³ to 2,000 mn³, preferably falls within a range of 1,000 nm³ to 1,700 nm³, and more preferably, falls within a range of 1,000 nm³ to 1,500 nm³. The $V_{XRD}$ can be adjusted by means of the size of the ferromagnetic hexagonal ferrite powder employed in the magnetic layer-forming composition, by means of the dispersion conditions during preparation of the magnetic layer-forming composition, and the like. The more intense the dispersion conditions, the lower the $V_{XRD}$ tends to be.

<$D_{x(107)}/D_{TEM}$>

The methods of measuring the $D_{x(107)}$ and $D_{TEM}$ are as set forth above. The $D_{x(107)}/D_{TEM}$ of the ferromagnetic hexagonal ferrite powder contained in the magnetic layer of the above magnetic tape is greater than or equal to 1.1. Having a $D_{x(107)}/D_{TEM}$ of greater than or equal to 1.1 is assumed by the present inventors to contribute to inhibiting increase in the coefficient of friction during running in a drive after storage of the magnetic tape in high-temperature, high-humidity environment. The presumptions of the present inventors in this regard are as set forth above. The $D_{x(107)}/D_{TEM}$ is desirably greater than or equal to 1.2, and preferably, greater than or equal to 1.3. By way of example, the $D_{x(107)}/D_{TEM}$ can be greater than or equal to 1.1 but less than or equal to 1.5. However, as set forth above, since the less the strain of the crystalline structure of the hexagonal ferrite, the higher and more desirable the value of the $D_{x(107)}/D_{TEM}$ is assumed to become, a value in excess of 1.5 is acceptable. For example, the $D_{x(107)}/D_{TEM}$ can be greater than or equal to 1.1 but less than or equal to 1.7, or greater than or equal to 1.1 but less than or equal to 1.6.

The $D_{TEM}$ can be adjusted by means of the size of the ferromagnetic hexagonal ferrite powder employed in the magnetic layer-forming composition, by means of the dispersion conditions during preparation of the magnetic layer-forming composition, and the like. The more intense the dispersion conditions, the tower the $D_{TEM}$ tends to become.

Additionally, the present inventors presume that the $D_{x(107)}$ decreases due to the strain on the crystalline structure of the hexagonal ferrite as set forth above. Accordingly, it is desirable to control the dispersion conditions during preparation of the magnetic layer-forming composition so as to inhibit the generation of strain in order to adjust $D_{x(107)}$. This point will be described further below. The $D_{x(107)}$, as well as $D_{(110)}$, can he adjusted by means of the size of the ferromagnetic hexagonal ferrite powder employed to prepare the magnetic layer-forming composition, the dispersion conditions during preparation of the magnetic layer-forming composition, and the like. For example, the longer the dispersion period, the lower $D_{x(107)}$ and $D_{(110)}$ tend to become.

With regard to $D_{TEM}$, $D_{x(107)}$, and $D_{x(110)}$, so long as $D_{x(107)}/D_{TEM}$ is greater than or equal to 1.1, the value of $D_{TEM}$ is not specifically limited. Further, so long as $D_{x(107)}/D_{TEM}$ is greater than or equal to 1.1 and the value of $V_{XRD}$ calculated using this value and $D_{x(110)}$ falls within the range set forth above, the value of $D_{x(107)}$ is not specifically limited. So long as the value of $V_{XRD}$ calculated using this value and $D_{x(107)}$ falls within the range set forth above, the value of $D_{x(110)}$ is not specifically limited. For example, $D_{TEM}$ can fall within a range of 1.0 nm to 10.0 nm, $D_{x(107)}$ can fall within a range of 1.0 nm to 15.0 nm, and $D_{x(110)}$ can fall within a range of 10.0 nm to 30.0 nm. However, there is no limitation to these ranges.

<ΔSFD Calculated with Equation 1>

The ΔSFD that is calculated with Equation 1 in the longitudinal direction of the magnetic tape falls within a range of 0.50 to 1.60. Having a ΔSFD of less than or equal to 1.60 is thought to contribute to the formation of a liquid film of fatty acid ester adequate to suppress increase in the coefficient of friction on the surface of the magnetic layer. Having a ΔSFD of greater than or equal to 0.50 is: also presumed to contribute to suppressing increase in the coefficient of friction. It is assumed that the lower the ΔSFD value, the greater the quantity of fatty acid ester forming the liquid film on the surface of the magnetic layer, Excess amount of fatty acid ester present is assumed to cause rise in coefficient of friction. Thus, the ΔSFD is set as being greater than or equal to 0.50. From the perspective of further suppressing increase in the coefficient of friction, the ΔSFD is desirably less than or equal to 1.55, preferably less than or equal to 1.50, more preferably less than or equal to 1.40, still more preferably less than or equal to 1.20, even more preferably less than or equal to 1.00, and even still more preferably, less than or equal to 0.90. From the same perspective, the ΔSFD is desirably greater than or equal to 0.55, preferably greater than or equal to 0.60, and more preferably, greater than or equal to 0.70. In a desirable embodiment, the ΔSFD falls within a range of 0.50 to 1.40, and in a preferred embodiment, the ΔSFD falls within a range of 0.50 to 1.00.

The ΔSFD is a value denoting the temperature dependence of the switching field distribution SFD as measured in the longitudinal direction of a magnetic tape. The smaller the value, the less the SFD changes due to temperature. The larger the value, the more the SFD changes due to temperature. The present inventors presume that setting the ΔSFD, as calculated with Equation 1 indicating the difference between $SFD_{25° C.}$ and $SFD_{-190° C.}$, fell within a range of 0.50 to 1.60 can contribute to suppression in rise in coefficient of friction of the magnetic tape during running in a drive after storage in high-temperature and high-humidity environment. The presumptions by the present inventors in this regard are described above. Based on research by the present inventors, the ΔSFD could be controlled by the method used to prepare the magnetic tape. The following tendencies were observed:

(A) the more dispersion of the ferromagnetic powder was increased in the magnetic layer, the lower the value became;

(B) the lower the SFD temperature dependence of the ferromagnetic powder employed, the lower the value became; and (C) the more aligned the ferromagnetic powder in the longitudinal direction of the magnetic layer (the greater the orientation in the longitudinal direction), the smaller the value became, and the lower the orientation property in the longitudinal direction, the higher the value became.

For example, as regards (A), examples are intensifying the dispersion conditions (lengthening the dispersion period, reducing the diameter and increasing packing of the dispersion beads used in dispersion, and the like) and using a dispersing agent. Known dispersing agents, commercial dispersing agents, and the like can be used without limitation as the dispersing agent.

Additionally, as an example of (B), the ferromagnetic powder—in which the difference $ΔSFD_{powder}$ between the SFD as measured in an environment with a temperature of 100° C. and the SFD as measured in an environment with a temperature of 25° C. as calculated with Equation 2 below falls within a range of 0.05 to 1.50—can be employed. However, even outside the above range, ΔSFD can be kept within the range of 0.50 to 1.60.

Equation 2

$$ΔSFD_{powder} = SFD_{powder\ 100° C.} - SFD_{powder\ 25° C.}$$

(In Equation 2, $SFD_{powder\ 100° C.}$ denotes the switching field distribution SFD of the ferromagnetic powder as measured in an environment with a temperature of 100° C. and $SFD_{powder\ 25° C.}$ denotes the switching field distribution SFD of the ferromagnetic powder as measured in an environment with temperature of 25° C.)

As regards (C), the method of conducting vertical orientation treatment of the magnetic layer or the method of no orientation by conducting no orientation treatment can be adopted.

Accordingly, for example, by employing one of means (A) to (C), or combining any two or more to effect controls, it is possible to obtain a magnetic tape in which ΔSFD falls within a range of 0.50 to 1,60.

<Lubricant>

Generally, fatty acids and derivatives of fatty acids, such as fatty acid esters and fatty acid amides, are widely employed as lubricants in magnetic tapes. Lubricants can generally be roughly divided into the groups of fluid lubricants and boundary lubricants. While fatty acid esters are components thought to function as fluid lubricants, fatty acids and fatty acid amides are thought to be components that function as boundary lubricants. Fluid lubricants are thought to be lubricants that form a liquid film on the surface of the magnetic layer, with flowing of the liquid film reducing friction. Conversely, boundary lubricants are thought to be lubricants that diminish contact friction by adsorbing to the surface of powder (such as ferromagnetic powder) and forming a final lubricating film. In this manner, fatty acid esters are thought to function differently from fatty acids and fatty acid amides as lubricants. The present inventors, as set forth above presume that having a $D_{x(107)}/D_{TEM}$ and a ΔSFD that fall within the ranges set forth above can contribute to fatty acid ester forming a liquid film on the surface of the magnetic layer that is sufficient to suppress rise in the coefficient of friction after storage in high-temperature and high-humidity environment.

Examples of fatty acid esters are esters of lauric acid, myristic acid, palmitic acid, stearic acid, oleic acid, linoleic acid, linolenic acid, behenic acid, erucic acid, and elaidic acid, such as butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate butoxyethyl stearate. The quantity of fatty acid ester in the magnetic layer-forming composition is, for example, 0 to 10.0 weight parts, desirably 1.0 to 7.0 weight parts, per 100.0 weight parts of ferromagnetic hexagonal ferrite powder. When two or more different fatty acid esters are added to the magnetic layer-forming composition, the content refers to the combined content thereof. Unless specifically stated otherwise, the same applies to the contents of other components in the present invention and the present specification. A composition containing fatty acid esters can also be employed as a nonmagnetic layer-forming composition to form a nonmagnetic layer. Such formation is desirable. The content of fatty acid esters in the nonmagnetic layer-forming composition is, for example, 0 to 10.0 weight parts, desirably 1.0 to 7.0 weight parts, per 100 weight parts of nonmagnetic powder. Lubricants such as fatty acid esters that are incorporated into the nonmagnetic layer-forming composition can move from the nonmagnetic layer to the magnetic layer during or after the manufacturing of a magnetic tape. Thus, the quantity of lubricant contained in the nonmagnetic layer-forming composition will not necessarily be the same as the quantity of lubricant contained in the nonmagnetic layer of the magnetic tape. Since lubricant can also move from the nonmagnetic layer to the magnetic layer, the quantity of lubricant contained in the magnetic layer-forming composition will not necessarily be the same as the quantity of lubricant contained in the magnetic layer of the magnetic tape.

Fatty acids and/or fatty acid amides can be contained in the magnetic layer. Examples of fatty acids are the various fatty acids given by way of example above. Stearic acid, myristic acid, and palmitic acid are desirable. Stearic acid is preferred. Fatty acids can be contained in the magnetic layer in the form of salts such as metal salts. Examples of fatty acid amides are amides of the various fatty acids set forth above, such as amide laurate, amide myristate, amide palmitate, and amide stearate. In fatty acids and fatty acid derivatives (such as esters and amides), the moiety derived from the fatty acid in a fatty acid derivative desirably has a structure that is identical or similar to the fatty acid with which it is being used in combination. As an example, when employing stearic acid as a fatty acid, the use of stearic acid ester and/or amide stearate is desirable.

The quantity of fatty acid in the magnetic layer-forming composition is, for example, 0.1 to 10.0 weight parts, desirably 1.0 to 7.0 weight parts, per 100.0 weight parts of ferromagnetic hexagonal ferrite powder. The content of fatty acid amide in the magnetic layer-forming composition is, for example, 0.1 to 3.0 weight parts, desirably 0.1 to 1.0 weight parts, per 100.0 weight parts of ferromagnetic hexagonal ferrite powder.

Additionally, the content of fatty acid in the nonmagnetic layer-forming composition is, for example, 1.0 to 10.0 weight parts, desirably 1.0 to 7.0 weight parts, per 100.0 weight parts of nonmagnetic powder. The content of fatty acid amide in the nonmagnetic layer-forming composition is, for example, 0.1 to 3.0 weight parts, desirably 0.1 to 1.0 weight parts, per 100.0 weight parts of nonmagnetic powder.

<Magnetic Layer>

The magnetic layer will be described in greater detail below.

(Ferromagnetic Hexagonal Ferrite Powder)

The $V_{XRD}$ and $D_{x(107)}/D_{TEM}$ of the ferromagnetic hexagonal ferrite powder are as set forth above. The hexagonal ferrite constituting the ferromagnetic hexagonal ferrite powder can be barium ferrite, strontium ferrite, lead ferrite, calcium ferrite, or a mixture of two or more of these crystals. Specific examples are magnetoplumbite-type (M-type) barium ferrite and strontium ferrite, magnetoplumbite-type ferrite in which the particles surfaces are coated with spinel, and composite magnetoplumbite-type barium ferrite and strontium ferrite containing a partial spinel phase.

For the ferromagnetic hexagonal ferrite powder (starting material powder) employed in the magnetic layer-forming composition, by way of example, the activation volume, which is an indicator of particle size, can fall within a range of 800 nm³ to 4,000 nm³. The activation volume is a value obtained by the method described in Examples further below. For details regarding ferromagnetic hexagonal ferrite powder, reference can be made to Japanese Unexamined Patent Publication (KOKAI) No. 2011216149, paragraphs 0134 to 0136. The content of the above publication is expressly incorporated herein by reference in its entirety. In one embodiment, ferromagnetic hexagonal ferrite powder with $\Delta SFD_{powder}$ failing within the range set forth above is desirably employed as starting material powder.

In one embodiment, the average particle size of the ferromagnetic hexagonal ferrite powder contained in the magnetic layer can fall within a range of 8 nm to 50 nm, and desirably falls within a range of 8 nm to 30 nm. The term "average particle size" of ferromagnetic hexagonal ferrite powder is measured by tracing the contours of particles (primary particles) as set forth above in a photograph of particles taken to determine the particle shape set forth above. Here, the term "particle size" refers to the plate diameter for plate-shaped particles, the major axis length for ellipsoid particles, the diameter for spherical particles, and the diameter of an equivalent circle for indeterminate shapes. The "equivalent circle diameter" is as set forth above. The arithmetic average of the particle size of 500 particles obtained by randomly extracting 500 particles is adopted as the average particle size. The average particle size is a value obtained by observation by transmission electron microscope without the particles that have been photographed having been subjected to an orientation treatment. It may thus not necessarily correspond to the value of the $D_{TEM}$ described above.

Unless specifically stated otherwise, the average particle size of the various powders described in the present invention and present specification is a value measured by the method set forth above.

The content (fill rate) of ferromagnetic powder (ferromagnetic hexagonal ferrite powder) in the magnetic layer desirably falls within a range of 50 weight % to 90 weight %, preferably within a range of 60 weight % to 90 weight %. The greater the fill rate the better from the perspective of increasing recording density.

(Binder and Curing Agent)

The above magnetic tape contains binder along with the ferromagnetic powder in the magnetic layer. One or a mixture of multiple resins from among polyurethane resins, polyester resins, polyamide resins, vinyl chloride resins, acrylic resins obtained by copolymerization of styrene, acrylonitrile, methyl methacrylate and the like, cellulose resins such as nitrocellulose, epoxy resins, phenoxy resins, polyvinyl alkyral resins such. as polyvinyl acetal and polyvinyl butyral, can be employed as binder. Of these, desirable examples are polyurethane resins, acrylic resins, cellulose resins, and vinyl chloride resins. These resins can be employed as binders in the nonmagnetic layer and backcoat layer, described further below. Reference can be made to paragraphs 0028 to 0031 of Japanese Unexamined Patent Publication (KOKAI) No. 2010-24113, which is expressly incorporated herein by reference in its entirety, regarding the above binder. Curing agents can be employed with suitable resins as the above binder. Polyisocyanate is suitable as a curing agent. Reference can be made to paragraphs 0124 and 0125 in Japanese Unexamined Patent Publication (KOKAI) No. 2011-216149 regarding polyisocyanate. The curing agent is employed, for example, in a quantity of 0 to 80.0 weight parts, desirably in a quantity of 50.0 to 80.0 weight parts from the perspective of enhancing the strength of the coating of the magnetic layer and the like, per 100.0 weight parts of binder.

(Additives)

The magnetic layer contains at least an additive in the form of fatty acid ester, and can further contain fatty acid and/or fatty acid amide as set forth above. As needed, additives can be added in addition to these lubricants. Examples of additives are nonmagnetic fillers, dispersing agents, dispersion adjuvants, antifungal agents, antistatic agents, oxidation inhibitors, and carbon black. The term "nonmagnetic filler" is synonymous with "nonmagnetic powder." Examples of nonmagnetic fillers are nonmagnetic fillers that are capable of functioning as abrasives and nonmagnetic fillers that are capable of functioning as protrusion-forming agents that form protrusions suitably protruding from the surface of the magnetic layer (such as nonmagnetic colloidal particles). A desirable example of nonmagnetic colloidal particles is silica colloidal particles (colloidal silica). in the present invention and the present specification, the term "colloidal particles" refers to particles that are capable of dispersing without precipitating to form a colloidal dispersion when 1 g thereof is added per 100 mL of an organic solvent in the form of at least one from among methyl ethyl ketone, cyclohexanone, toluene, ethyl acetate, and mixtures of any two or more of these solvents any mixing ratio. The average particle size of the colloidal particles is a value determined by the method described as a method of measuring the average particle diameter in Japanese Unexamined Patent Publication (KOKAI) No. 2011-048878, paragraph 0015. The content of the above publication is expressly incorporated herein by reference in its entirety. In addition, examples of dispersing agents are known dispersing agents such as carboxyl group-containing compounds and nitrogen-containing compounds. Examples of nitrogen-containing compounds are primary amines denoted by $NH_2R$, secondary amines denoted by $NHR_2$, and tertiary amines denoted by $NR_3$. In these formulas, R denotes any structure constituting a. nitrogen-containing compound. Multiple instances of R can be identical or different. The nitrogen-containing compound can be a compound (polymer) containing multiple repeating structures within the compound. The present inventors presume that the fact that the nitrogen-containing moiety of the nitrogen-containing compound can function as a moiety that adsorbs to the surface of the particles of ferromagnetic hexagonal ferrite powder is why nitrogen-containing compounds can work as a dispersing agent. Examples of carboxyl group-containing compounds are fatty acids such as oleic acid. The present inventors presume that the fact that the carboxyl groups in the carboxyl group-containing compound can function as a moiety that adsorbs to the surface of the particles of ferromagnetic hexagonal ferrite powder is why carboxyl group-containing compounds can work as a dispersing agent. It is also desirable to employ carboxyl group-containing compounds and nitrogen-containing compounds in combination.

Additives can he suitably selected for use from among commercial products based on the properties that are desired.

The above-described magnetic layer is disposed over a nonmagnetic layer on a nonmagnetic support. The nonmagnetic layer and nonmagnetic support will be described in detail further below.

<Nonmagnetic Layer>

In the above magnetic tape, a nonmagnetic layer containing nonmagnetic powder and binder can be present between the nonmagnetic support and the magnetic layer. The nonmagnetic powder that is employed. in the nonmagnetic layer can be an organic or an inorganic substance. Carbon black or the like can also be employed. Examples of inorganic materials are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details. Reference can be made to Japanese Unexamined Patent Publication (KOKAI) No. 2010-24113, paragraphs 0040 and 0041, for details on carbon black that can be used in the nonmagnetic layer. The content (fill rate) of nonmagnetic powder in the nonmagnetic layer desirably falls within a range of 50 weight % to 90 weight %, preferably within a range of 60 weight % to 90 weight %.

For other details regarding binder, additives, and the like in the nonmagnetic layer, known techniques relating to nonmagnetic layers can be applied. As a further example, known techniques relating to magnetic layers can be applied with regard to the quantity and type of binders and the quantity and type of additives.

The nonmagnetic layer of the magnetic tape of an aspect of the present invention may be in the form of an essentially nonmagnetic layer containing small quantities of ferromagnetic powder, either in the form of impurities or by intention, for example, along with nonmagnetic powder. in the present invention, the term "essentially nonmagnetic layer" refers to a layer with a residual magnetic flux density of less than or equal to 10 mT or a coercive force of less than or equal to 7.96 kA/m (100 Oe), or a layer with a residual magnetic flux density of less than or equal to 10 mT and a coercive force of less than or equal to 7.96 kA/m (100 Oe). The no magnetic layer desirably has neither residual magnetic flux density nor coercive force.

<Backcoat Layer>

A backcoat layer containing nonmagnetic powder and binder can be present on the opposite side of the nonmagnetic support from that on which the magnetic layer and nonmagnetic layer are present. The backcoat layer desirably contains carbon black and/or inorganic powder. Known techniques relating to the formulas of the magnetic layer and/or nonmagnetic layer can be applied to the binder and various optionally contained additives.

<Nonmagnetic Support>

The nonmagnetic support will be described next. Known nonmagnetic supports in the form of biaxially stretched polyethylene terephthalate, polyethylene naphthalate, polyamide, polyamide-imide, aromatic polyamide, and the like are examples. Of these, polyethylene terephthalate, polyethylene naphthalate, and polyamide are desirable. These supports can be subjected in advance to treatments such as corona discharge, plasma treatments, adhesion-enhancing treatments, and heat treatments.

<Thicknesses of the Nonmagnetic Support, Magnetic Layer, Nonmagnetic Layer, and Backcoat Layer>

The thickness of the nonmagnetic support and various layers of the above magnetic tape are as follows, The thickness of the nonmagnetic support can falls within a range of, for example, 3.0 μm to 80.0 μm, desirably within a range of 3.0 μm to 50.0 μm, and preferably, within a range of 3.0 μm to 10.0 μm.

The thickness of the magnetic layer can be optimized based on the saturation magnetization level and head gap length of the magnetic head employed, and the bandwidth of the recording signal. It is generally 10 nm to 100 nm. From the perspective of high density recording, it desirably falls within a range of 20 nm to 90 nm, preferably within a range of 30 nm to 70 nm. It suffices for the magnetic layer to be at least a single layer, and the magnetic layer can be divided into two or more layers with different magnetic characteristics. Known structures of multilayered magnetic layers can he applied.

The thickness of the nonmagnetic layer is, for example, greater than or equal to 50 nm, desirably greater than or equal to 70 nm, and preferably, greater than or equal to 100 nm. The thickness of the nonmagnetic layer is desirably less than or equal to 800 nm, preferably less than or equal to 500 nm.

The thickness of the backcoat layer is desirably less than or equal to 0.9 μm, preferably falling within a range of 0.1 μm to 0.7 μm.

The thickness of the various layers of the magnetic tape and the nonmagnetic support can be determined by known film thickness measuring methods. For example, a cross-section in the direction of thickness of the magnetic tape can be exposed by a known technique such as an ion beam or microtome, and the exposed cross-section can be observed by a scanning electron microscope. Various thicknesses can be determined, such as the thickness determined at one spot in the direction of thickness by observing the cross-section, or the arithmetic average thickness calculated at two or more spots—for example, two randomly extracted spots. The thicknesses of the various layers can also be obtained as design. thicknesses calculated from manufacturing conditions.

<Manufacturing Process>
(Preparing the Various Layer-Forming Compositions)

The process of preparing the compositions for forming the various layers, such as the magnetic layer, nonmagnetic layer, and backcoat layer, normally includes at least a kneading step, a dispersion step, and mixing steps provided before and after these steps as needed. Each of these steps can he divided into two or more stages. All of the starting materials in the form of ferromagnetic powder, hinder, nonmagnetic powder, various additives, solvent, and the like that are employed for the preparation of the compositions for forming the various layers can be added at the start, or part way through, any of these steps. One or more of the various solvents that are commonly employed in the manufacturing of particulate magnetic recording media can be employed as solvents. Reference can be made to Japanese Unexamined Patent Publication (KOKAI) No. 2011-216149, paragraph 0153, regarding solvents. An individual starting material can be divided for addition in two or more steps. For example, binder can be divided up and added in the kneading step, dispersing step, and in a kneading step after the dispersing step for viscosity adjustment. To manufacture the above magnetic tape, conventionally known manufacturing techniques can be employed, An open kneader, continuous kneader, pressurized kneader, extruder, or some other device with powerful kneading force is desirably employed in the kneading step. Details regarding these kneading processes are given in Japanese Unexamined Patent Publication (KOKAI) Heisei Nos. 1-106338 and 1-79274, which are expressly incorporated herein by reference in their entirety. A known disperser can be employed.

With regard to dispersion of the magnetic layer-forming composition, the present inventors presume the fact that dispersion is conducted in a two-stage dispersion treatment as set forth above makes it possible to inhibit the generation of strain on the crystalline structure of ferromagnetic hexagonal ferrite powder. From this perspective, a desirable manufacturing method is:

a method of manufacturing the magnetic tape set forth above, including:

forming a magnetic layer through preparation of a magnetic layer-forming composition and coating of the magnetic layer-forming composition that has been prepared on a nonmagnetic layer that has been formed on a nonmagnetic support, wherein the preparation of the magnetic layer-forming composition includes:

a first stage of dispersing ferromagnetic hexagonal ferrite powder, binder, and solvent in the presence of first dispersion beads to obtain a dispersion, arid a second stage of dispersing the dispersion obtained in the first stage in the presence of second dispersion beads of smaller bead diameter and lower density than the first dispersion beads.

It is desirable for coarse aggregates of the ferromagnetic hexagonal ferrite powder to be crushed in the above first stage, and then subsequently dispersed in the second stage. In order to increase dispersibility of the ferromagnetic hexagonal ferrite powder, it is desirable for the first and second stages to be conducted prior to dispersion treatment in which the ferromagnetic hexagonal ferrite powder is mixed with other powder components. For example, when forming a magnetic layer containing the above nonmagnetic fillers (abrasive, protrusion-forming agent), it is desirable to conduct the first and second stages as a dispersion treatment of a liquid (magnetic liquid) containing the ferromagnetic hexagonal ferrite powder, binder, solvent, and optionally added additives prior to mixing in the nonmagnetic filler.

The diameter of the second dispersion beads is desirably less than or equal to 1/100, preferably less than or equal to 1/500, the diameter of the first dispersion beads. By way of example, the diameter of the second dispersion heads is greater than or equal to 1/10,000 the diameter of the first dispersion beads. However, there is no limitation to this range. For example, the diameter of the second dispersion beads desirably falls within a range of 80 nm to 1,000 nm. Also by way of example, the diameter of the first dispersion beads can fall within a range of 0.2 nm to 1.0 mm.

In the present invention and specification, the bead diameter is a value that is measured by the same method as that used to measure the average particle size of the powder that is set forth above.

The second stage is desirably conducted under conditions where the second dispersion beads, based on weight, are present in a quantity that is greater than or equal to 10-fold, preferably under conditions where they are present in a quantity of 10-fold to 30-fold, the quantity of the ferromagnetic hexagonal ferrite powder The quantity of the first dispersion beads in the first stage also desirably falls within the above range.

The second dispersion beads are of lower density than the first dispersion beads. The density being referred to here is calculated by dividing the weight (unit: g) of the dispersion beads by the volume (unit: $cm^3$). Measurement is conducted by Archimedes' method. The density of the second dispersion beads is desirably less than or equal to 3.7 $g/cm^3$, preferably less than or equal to 3.5 $g/cm^3$. Examples of second dispersion beads that are desirable from the perspective of density are: diamond beads, silicon carbide beads, and silicon nitride beads. Diamond beads are an example of second dispersion beads that are desirable from the perspective of density and hardness.

The first dispersion beads are desirably in the form of dispersion beads with a density exceeding 3.7 $g/cm^3$, preferably a density of greater than or equal to 3.8/$cm^3$, and more preferably a density of greater than or equal to 4.0 $g/cm^3$. By way of example, the density of the first dispersion beads is less than or equal to 7.0 $g/cm^3$, but can exceed 7.0 $g/cm^3$. Zirconia beads, alumina beads, and the like are desirably employed as the first dispersion beads, with the use of zirconia. beads being preferred.

The longer the dispersion period for example, the longer the dispersion period, of the second stage—the smaller $V_{XRD}$ and $D_{x(107)}$ tend to become. The longer the dispersion period, the smaller $\Delta SFD$ tends to become. The dispersion period is not specifically limited, and can be set based on the type of disperser employed or the like.

(Coating Step)

The magnetic layer can be formed by successively or simultaneously multilayer coating the magnetic layer-forming composition and nonmagnetic layer-forming composition, The backcoat layer can be formed by coating the backcoat layer-forming composition on the opposite side of the nonmagnetic support from the side on which the magnetic layer and nonmagnetic layer are present on which these layers will be subsequently formed). Reference can be made to Japanese Unexamined Patent Publication (KOKAI) No. 2010-231843, paragraph 0066, for details on coating to form the various layers. The content of the above publication is expressly incorporated herein by reference in its entirety.

(Other Steps)

Reference can be made to Japanese Unexamined Patent Publication (KOKAI) No. 2010-231843, paragraphs 0067 to 0070, with regard to various other steps in the manufacturing of a magnetic tape.

The magnetic tape of an aspect of the present invention as set forth above can run in a drive with a low coefficient of friction even after storage in high-temperature and high-humidity environment.

EXAMPLES

The present invention will be described based on Examples below. However, the present invention is not intended to be limited by the embodiments described in Examples. The "parts" and "%" indicated below denote "weight parts" and "weight %" unless specifically indicated otherwise.

The activation volume is a value that is measured and calculated using powder from. the same lot as the ferromagnetic hexagonal ferrite powder used in the magnetic layer-forming composition. Measurement was conducted at a 3-minute and 30-minutes magnetic field sweep rate of the coercive force He measuring element in a vibrating sample magnetometer (made by Toei Industry Co., Ltd.). The activation volume was calculated from the equation relating He due to thermal fluctuation and activation volume V that is given below. The measurements were made in an environment of 23° C.±1° C.

$$He32\ 2Ku/Ms(1-((KuT/kV)1n(At/0.693))1/2)$$

(In the equation, Ku: anisotropy constant; Ms: saturation magnetization; k: Boltzmann constant; T: absolute temperature; V: activation volume; A: spin precession frequency; t: magnetic field inversion time)

The weight average molecular weights given below are values measured under the following conditions by gel permeation chromatography (GPC) and converted with polystyrene conversion.

GPC device: HLC-8120 (made by Tosoh)
Column: TSK gel Multipore HXL-M (made by Tosoh, 7.8 min inner diameter (ID)×30.0 cm)
Eluent: tetrahydrofuran (THF)

The specific surface area is a value measured for primary particles by the nitrogen adsorption method (also called the Brunauer-Emmett-Teller (BET) single point method). The specific surface area obtained by this method will be referred to as the BET specific surface area hereinafter.

Example 1

The formulas of the various layer-forming compositions are given below.
<Formula of Magnetic Layer-Forming Composition>
(Magnetic Liquid)
  Ferromagnetic hexagonal ferrite powder (M-type barium ferrite, $\Delta SFD_{powder}$: see Table 1, activation volume: see Table 1): 100.0 parts
  Oleic acid: 2.0 parts
  Vinyl chloride copolymer (MR-104, made by Zeon Corp.): 10.0 parts
  $SO_3Na$ group-containing polyurethane resin
  (weight average molecular weight: 70,000; $SO_3Na$ groups: 0.07 meq/g): 4.0 parts
  Amine polymer (DISPERBYK-102, made by BYK Chemie): 6.0 parts
  Methyl ethyl ketone: 150.0 parts
  Cyclohexanone: 150.0 parts
(Abrasive Liquid)
  α-Alumina (BET specific surface area: 19 m²g): 6.0 parts
  $SO_3Na$ group-containing polyurethane resin
  (weight average molecular weight: 70,000; $SO_3Na$ groups: 0.1 meq/g): 0.6 part
  2,3-Dihydroxynaphthalene: 0.6 part
  Cyclohexanone: 23.0 parts
(Protrusion-Forming Agent Liquid)
  Colloidal silica (average particle size: 120 nm): 2.0 parts
  Methyl ethyl ketone: 8.0 parts
(Lubricant and Curing Agent Liquid)
  Stearic acid: 3.0 parts
  Stearic amide: 0.3 part
  Butyl stearate: 6.0 parts
  Methyl ethyl ketone: 110.0 parts
  Cyclohexanone: 110.0 parts
  Polyisocyanate (Coronate (Japanese registered trademark) L made by Nippon Polyurethane Industry Co., Ltd.): 3.0 parts
<Formula of Nonmagnetic Layer-Forming Composition×
  Nonmagnetic inorganic powder α-iron oxide (average particle size: 10 nm, BET specific surface area: 75 m²/g): 100.0 parts
  Carbon black (average particle size: 20 nm): 25.0 parts
  $SO_3Na$-group containing polyurethane resin (weight average molecular weight: 70,000, $SO_3Na$ group content: 0.2 meq/g): 18.0 parts
  Stearic acid: 1.0 part
  Cyclohexanone: 300.0 parts
  Methyl ethyl ketone: 300.0 parts
<Formula of Backcoat Layer-Forming Composition>
  Nonmagnetic inorganic powder: α-iron oxide (average particle size: 0.15 μm, BET specific surface area: 52 m²/g): 80.0 parts
  Carbon black (average particle size: 20 nm): 20.0 parts
  Vinyl chloride copolymer: 13.0 parts
  Sulfonate group-containing polyurethane resin: 6.0 parts
  Phenylphosphonic acid: 3.0 parts
  Cyclohexanone: 155.0 parts
  Methyl ethyl ketone: 155.0 parts
  Stearic acid: 3.0 parts
  Butyl stearate: 3.0 parts
  Polyisocyanate: 5.0 parts
  Cyclohexanone: 200.0 parts
<Preparation of Magnetic Layer-Forming Composition>

The magnetic layer-forming composition was prepared by the following method. The various components of the above magnetic liquid were dispersed for 24 hours using zirconia beads with a bead diameter of 0.5 mm (first dispersion beads, density: 6.0 g/cm³) in a batch-type vertical sand mill, and then filtered using a filter having an average pore diameter of 0.5 μm to prepare dispersion A (first stage). The zirconia beads were employed in a 10-fold quantity relative to the ferromagnetic hexagonal barium ferrite powder based on weight.

Subsequently, dispersion A was dispersed for 1 hour using diamond heads with a bead diameter of 500 (second dispersion beads, density: 3.5 g/cm³) in a batch-type vertical sand mill. The diamond beads were separated using a centrifuge to prepare a dispersion (dispersion B). The magnetic liquid indicated below is the dispersion liquid B that was obtained (second stage). A ten-fold quantity of diamond beads based on weight was employed relative to the ferromagnetic hexagonal barium ferrite powder.

The abrasive liquid was prepared as follows. The various components of the abrasive liquid set forth above were mixed, the mixture was charged to a horizontal bead mill disperser together with zirconia beads with a head diameter of 0.3 mm, and the bead volume/(abrasive liquid volume+ bead volume) was adjusted to 80%. The mixture was dispersed for 120 minutes in a bead mill disperser, the liquid was removed following processing, and a flow-type ultrasonic dispersion filter device was used to conduct ultrasonic dispersion filtration to prepare the abrasive liquid.

The magnetic liquid and abrasive liquid that had been prepared, as well as the above-described protrusion-forming agent liquid as well as the lubricant and curing agent liquid, were charged to a dissolver stirrer and stirred for 30 minutes at a peripheral speed of 10 m/s. The mixture was then passed three times through a flow-type ultrasonic disperser at a flow rate of 7.5 kg/min and filtered with a filter having a pore diameter of 1 μm to prepare a magnetic layer-forming composition.

<Preparation of Nonmagnetic Layer-Forming Composition>

The various components of the nonmagnetic layer-forming composition set forth above were dispersed for 24 hours using zirconia beads with a bead diameter of 0.1 mm in a batch-type vertical sand mill. Subsequently, the mixture was filtered using a filter having an average pore diameter of (0.5 μm to prepare a nonmagnetic layer-forming composition.

<Preparation of Backcoat Layer-Forming Composition>

All of the various components of the backcoat layer-forming composition set forth above except for the lubricants (stearic acid and butyl stearate), polyisocyanate, and 200.0 parts of the cyclohexanone, were kneaded and diluted in an open kneader. The mixture was then subjected to 12 passes of dispersion, each pass including a retention time of 2 minutes at a rotor tip peripheral speed of 10 m/s and at a bead fill rate of 80 volume % using zirconia beads with a bead diameter of 1 mm in a horizontal-type bead mill disperser. Subsequently, the remaining components were added, the mixture was stirred in a dissolver, and the dispersion obtained was filtered with a filter having an average pore diameter of 1 μm to prepare a backcoat layer-forming composition.

<Fabrication of Magnetic Tapes>

The nonmagnetic layer-forming composition prepared as set forth above was coated and dried to a dry thickness of 100 nm on the surface of a polyethylene naphthalate support 5.0 μm in thickness, and the magnetic layer-forming composition prepared as set forth above was coated thereover in a quantity calculated to yield a dry thickness of 70 nm. While the magnetic layer-forming composition was still wet, a magnetic field with a field strength of 0.3 T was applied in a direction perpendicular to the coating surface in perpendicular orientation processing. The composition was then dried. Subsequently, the backcoat layer-forming composition that had been prepared as set forth above was coated and dried to a thickness of 0.4 μm on the opposite surface of the support. The product obtained was calendered (treated to flatten the surface) at a roll surface temperature of 100° C., a liner pressure of 300 kg/cm, and a rate of 100 m/min with a calender comprised solely of metal rolls and then heat treated for 36 hours in a 70° C. environment. Following the heat treatment, the product was slit to ½ inch. (0.0127 meter) width to obtain a magnetic tape.

Examples 2 to 5, Comparative Examples 1 I to 6

With the exception that the ferromagnetic hexagonal barium ferrite powders (M-type barium ferrite) having the activation volumes given in Table 1 and the $\Delta SFD_{powder}$ given in Table 1 were employed and the second stage was conducted under the conditions given in Table 1 (with no second stage in Comparative Example 5) dispersion processing of the magnetic liquid, magnetic, tapes were fabricated in the same manner as in Example 1.

<Measurement and Evaluation Methods>

1. Average Particle Size and Observation of the Shape of the Ferromagnetic Hexagonal Ferrite Powder A tape sample was obtained by cutting out a portion of the magnetic tape of each of Examples and Comparative Examples. The backcoat layer was removed with acetone, the tape sample was immersed in ethanol, and ultrasonic dispersion was conducted. The ethanol caused the magnetic layer to swell, separating the ferromagnetic hexagonal ferrite powder from the magnetic layer. The separated ferromagnetic hexagonal ferrite powder was then recovered by filtration. When nonmagnetic filler is recovered along with the ferromagnetic hexagonal ferrite powder, a magnet can be used to separate the ferromagnetic hexagonal ferrite powder and nonmagnetic filler.

It is also possible to remove the backcoat layer with a solvent other than acetone. The magnetic layer can also be made to swell with solvent other than ethanol to separate the ferromagnetic hexagonal ferrite powder.

A 1 mg quantity of the recovered ferromagnetic hexagonal ferrite powder (powder to be photographed) was placed in 5 mL of pure water and ultrasonically dispersed (28 kHz, 10 minutes) to prepare a dispersion. A 5 μL quantity of the dispersion prepared was dripped onto a mesh (grid-like sample plate) and dried naturally (without orientation processing). The powder to be photographed was placed in a transmission electron microscope along with the grid mesh and photographed with the transmission electron microscope. The shape of the particles was observed in the photograph obtained. As a result, all of the particles of the ferromagnetic hexagonal ferrite powders employed in Examples and Comparative Examples were found to have plate-like shapes.

When particle photographs that had been taken were used to determine the average particle size (average plate diameter) by the method set forth above, these values were found to fall within a range of 10 nm to 30 nm for both Examples and Comparative Examples.

2. Particle Size in the Direction of the Easy Axis of Magnetization $D_{TEM}$ as Determined by Observation With Transmission Electron Microscope A 1 mg quantity of the ferromagnetic hexagonal ferrite powder recovered in 1. above was placed in 5 mL of pure water and ultrasonically dispersed (28 kHz, 10 minutes) to prepare a dispersion, A 5 μL quantity of the dispersion prepared was dripped onto a grid mesh (mesh-like sample dish) on both sides of which (right and left) magnets (each having a magnetic strength of 1.5 T) had been positioned, and allowed to dry naturally. The powder to be photographed was thus subjected to horizontal orientation processing. Each grid mesh of powder to be photographed that had been subjected to orientation processing was placed within a transmission electron microscope and the $D_{TEM}$ (average plate thickness) was determined by the method set forth above.

3. Crystallite Volume $V_{XRD}$ as Determined by X-Ray Diffraction Analysis

The magnetic layers of the magnetic tapes of Examples and Comparative Examples were scraped off with a blade to obtain test specimens (in powder form) for X-ray diffraction analysis.

A roughly 0.03 g quantity of test specimen was employed to conduct X-ray diffraction analysis under the conditions set forth above. A RINT 2500 made by Rigaku Corp. was employed as the powder X-ray diffraction measurement device. Based on the analysis results, $D_{x(107)}$ and $D_{x(110)}$ were calculated by the method set forth above. $V_{XRD}$ was calculated from $D_{x(107)}$ and $D_{x(110)}$ using the equation set forth above.

4. $\Delta SFD_{powder}$ of Ferromagnetic Hexagonal Ferrite Powder

A vibrating sample magneto (made by Toei-Kogyo Co., Ltd.) was employed to measure the SFD at an applied magnetic field of 796 kA/m (10 Oe) in an environment with temperatures of 100° C. and 25° C. in the ferromagnetic powders. $\Delta SFD_{powder}$ was calculated using Equation 2 from the SFD measurement results.

5. $\Delta SFD$ in the longitudinal direction of the Magnetic Tape

A vibrating sample magnetometer (made by Toei-Kogyo Co., Ltd.) was employed to measure the SFD in the longitudinal direction of the magnetic tape at an applied magnetic field of 796 kA/m (10 Oe) in environments with temperatures of 25° C. and −190° C. The $\Delta SFD$ was calculated using Equation 1 from the SFD measurement results.

6. Electromagnetic Characteristics (SNR)

For the magnetic tapes of Examples and Comparative Examples, a recording head (metal-in-gap (MIG)), gap length 0.15 μm, saturation magnetization density 1.8 T) and a reproduction-use giant magnetoresistive (GMR) head reproduction track width: 1 μm) were mounted on a loop tester and a signal was recorded at a linear recording density of 200 kfci in an environment of 23° C.±1° C. The SNR was then measured. The SNRs of Examples and Comparative Examples are given in Table 1 as values relative to the SNR of Comparative Example 4, which was adopted as 0 dB. A tape with an SNR of greater than or equal to +1.0 dB, desirably greater than or equal to +1.5 dB, was evaluated as having properties capable of meeting the stringent needs that are expected to accompany the higher recording densities of the future.

7. Measurement of the Coefficient After Storage in High-Temperature, High-Humidity Environment Each of the tapes of Examples and Comparative Examples was wound up on a reel and stored for one week in an environment with a temperature of 60° C. and a relative humidity of 90% in that state. After storage, the magnetic tape was subjected to 10 repeated passes of running at a speed of 14 mm/sec with the surface of the magnetic layer in contact with an SUS (steel use stainless) 420 member in an environment at with a temperature of 23° C. and a relative humidity of 50% with application of a 50 g load. The coefficient of friction was measured on the 10th pass. The measurement results are given in Table 1. When the coefficient of friction with repeated running exceeded 0.80 (>0.80), surface of the magnetic layer ended up adhering to the SUS 420 member, precluding subsequent running. For such comparative examples, ">0.80 (adhesion)" has been recorded in Table 1.

The above measurement results and evaluation results are given in Table 1.

TABLE 1

|  |  | Ex. 1 | Ex. 2 | Ex. 3 | Comp. Ex. 1 |
|---|---|---|---|---|---|
| Ferromagnetic hexagonal ferrite powder | Type | Ferromagnetic hexagonal ferrite powder A | Ferromagnetic hexagonal ferrite powder A | Ferromagnetic hexagonal ferrite powder A | Ferromagnetic hexagonal ferrite powder A |
|  | $\Delta SFD_{powder}$ | 1.80 | 1.80 | 1.80 | 1.80 |
|  | Activation volume [nm³] |  |  | 1500 |  |
| Second stage in dispersion treatment of magnetic liquid | Quantity of dispersion beads (relative to ferromagnetic hexagonal ferrite powder) | 10-fold | 10-fold | 20-fold | 20-fold |
|  | Dispersion period | 1 h | 2 h | 1 h | 2 h |
| $V_{XRD}$ [nm] |  | 2400 | 1900 | 1400 | 1100 |
| $D_{x(107)}/D_{TEM}$ |  | 1.5 | 1.2 | 1.1 | 0.9 |
| $\Delta SFD$ |  | 1.58 | 1.40 | 1.52 | 1.20 |
| SNR [dB] |  | +1.0 | +1.3 | +1.6 | +2.1 |
| Coefficient of friction after storage in high-temperature and high-humidity environment |  | 0.45 | 0.42 | 0.48 | >0.80 (adhesion) |

|  |  | Comp. Ex. 2 | Ex. 4 | Comp. Ex. 3 | Ex. 5 | Comp. Ex. 4 | Comp. Ex. 5 | Comp. Ex. 6 |
|---|---|---|---|---|---|---|---|---|
| Ferromagnetic hexagonal ferrite powder | Type | Ferromagnetic hexagonal ferrite powder B | Ferromagnetic hexagonal ferrite powder B | Ferromagnetic hexagonal ferrite powder B | Ferromagnetic hexagonal ferrite powder B | Ferromagnetic hexagonal ferrite powder B | Ferromagnetic hexagonal ferrite powder C | Ferromagnetic hexagonal ferrite powder D |
|  | $\Delta SFD_{powder}$ | 0.82 | 0.82 | 0.82 | 0.82 | 0.82 | 0.60 | 1.95 |
|  | Activation volume [nm³] |  |  | 1500 |  |  | 1500 | 1500 |
| Second stage in dispersion | Quantity of dispersion beads | Second stage was not | 10-fold | 10-fold | 20-fold | 20-fold | 10-fold | 10-fold |

TABLE 1-continued

| treatment of magnetic liquid (relative to ferromagnetic hexagonal ferrite powder) | conducted | | | | | | |
|---|---|---|---|---|---|---|---|
| Dispersion period | — | 1 hr | 2 h | 1 hr | 2 h | 1 hr | 1 h |
| $V_{XRD}$ [nm] | 3800 | 2200 | 1800 | 1300 | 950 | 2350 | 2300 |
| $D_{x(107)}/D_{TEM}$ | 1.5 | 1.5 | 1.3 | 1.1 | 1.0 | 1.5 | 1.5 |
| ΔSFD | 0.82 | 0.62 | 0.45 | 0.53 | 0.40 | 0.38 | 1.65 |
| SNR [dB] | −0.2 | +1.1 | +1.3 | +1.7 | 0 | +1.0 | +1.0 |
| Coefficient of friction after storage in high-temperature and high-humidity environment | 0.36 | 0.30 | >0.80 (adhesion) | 0.40 | >0.80 (adhesion) | >0.80 (adhesion) | >0.80 (adhesion) |

Based on the results given in Table 1, the magnetic tapes of Examples (magnetic tapes with multilayer structures) exhibited good electromagnetic characteristics, with the rise in the coefficient of friction being determined to have been suppressed after storage in high-temperature, high-humidity environment.

An aspect of the present invention is useful in the technical field of high-density magnetic recording media such as backup tapes.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic tape,
    which comprises a nonmagnetic layer comprising nonmagnetic powder and binder on a nonmagnetic support and a magnetic layer comprising ferromagnetic powder and binder on the nonmagnetic layer, wherein
    a fatty acid ester is contained in at least the magnetic layer;
    the ferromagnetic powder is ferromagnetic hexagonal ferrite powder;
    the ferromagnetic hexagonal ferrite powder has a crystallite volume as determined by X-ray diffraction analysis ranges from 1,000 nm$^3$ to 2,400 nm$^3$, and a ratio of a crystallite size $D_{x(107)}$ obtained from a diffraction peak of a (107) plane to a particle size in a direction of an easy axis of magnetization $D_{TEM}$ as determined by observation with a transmission electron microscope, $D_{x(107)}/D_{TEM}$, is greater than or equal to 1.1; and
    ΔSFD in a longitudinal direction of the magnetic tape as calculated with Equation 1 ranges from 0.50 to 1.60:

Equation 1

$$\Delta SFD = SFD_{25°\,C.} - SFD_{-190°\,C.}$$

wherein, in Equation 1, $SFD_{25°\,C.}$ denotes a switching field distribution SFD as measured in the longitudinal direction of the magnetic tape in an environment with a temperature of 25° C., and $SFD_{-190°\,C.}$ denotes a switching field distribution SFD as measured in the longitudinal direction of the magnetic tape in an environment with a temperature of −190° C.

2. The magnetic tape according to claim 1,
    wherein the $D_{x(107)}/D_{TEM}$ of the ferromagnetic hexagonal ferrite powder falls within a range of 1.1 to 1.5.

3. The magnetic tape according to claim 1,
    wherein the crystallite volume as determined by X-ray diffraction of the ferromagnetic hexagonal ferrite powder falls within a range of 1,000 nm$^3$ to 1,500 nm$^3$.

4. The magnetic tape according to claim 2,
    wherein the crystallite volume as determined by X-ray diffraction of the ferromagnetic hexagonal ferrite powder falls within a range of 1,000 nm$^3$ to 1,500 nm$^3$.

5. The magnetic tape according to claim 1,
    wherein the ΔSFD falls within a range of 0.50 to 1.00.

6. The magnetic tape according to claim 2,
    wherein. the ΔSFD falls within a range of 0.50 to 1.00.

7. The magnetic tape according to claim 3,
    wherein the ΔSFD falls within a range of 0.50 to 1.00.

8. The magnetic tape according to claim 4,
    wherein the ΔSFD falls within a range of 0.50 to 1.00.

9. A method of manufacturing a magnetic tape,
    wherein the magnetic tape is a magnetic tape which comprises a nonmagnetic layer comprising nonmagnetic powder and binder on a nonmagnetic support and a magnetic layer comprising ferromagnetic powder and binder on the nonmagnetic layer, wherein
    a fatty acid ester is contained in at least the magnetic layer;
    the ferromagnetic powder is ferromagnetic hexagonal ferrite powder;
    the ferromagnetic hexagonal ferrite powder has a crystallite volume as determined by X-ray diffraction analysis ranges from 1,000 nm$^3$ to 2,400 nm$^3$, and a ratio of a crystallite size $D_{x(107)}$ obtained from a diffraction peak. of a (107) plane to a particle size in a direction of an easy axis of magnetization $D_{TEM}$ as determined by observation with a transmission electron microscope, $D_{x(107)}/D_{TEM}$, is greater than or equal to 1.1; and ΔSFD in a longitudinal direction of the magnetic tape as calculated with Equation 1 ranges from 0.50 to 1.60:

Equation 1

$$\Delta SFD = SFD_{25°C} - SFD_{-190°C}$$

wherein, in Equation 1, $SFD_{25°C}$ denotes a switching field distribution SFD as measured in the longitudinal direction of the magnetic tape in an environment with a temperature of 25° C., and $SFD_{-190°C}$ denotes a switching field distribution SFD as measured in the longitudinal direction of the magnetic tape in an environment with a temperature of −190° C.; and wherein the method comprises forming a magnetic layer through preparation of a magnetic, layer-forming composition and coating of the magnetic layer-forming composition that has been prepared on a nonmagnetic layer that has been formed on a nonmagnetic support, wherein the preparation of the magnetic layer-forming composition comprises:

a first stage of dispersing ferromagnetic hexagonal ferrite powder, binder, and solvent in the presence of first dispersion beads to obtain a dispersion, and a second stage of dispersing the dispersion obtained in the first stage in the presence of second dispersion beads of smaller bead diameter and lower density than the first dispersion beads.

10. The method of manufacturing a magnetic tape according to claim 9, wherein the second stage is conducted in the presence of a quantity of second dispersion beads that is greater than or equal to 10-fold the quantity of ferromagnetic hexagonal ferrite powder based on weight.

11. The method of manufacturing a magnetic tape according to claim 9, wherein the bead diameter of the second dispersion beads is less than or equal to 1/100 the bead diameter of the first dispersion beads.

12. The method of manufacturing a magnetic tape according to claim 9, wherein the bead diameter of the second dispersion beads falls within a range of 80 nm to 1,000 nm.

13. The method of manufacturing a magnetic tape according to claim 9, wherein the density of the second dispersion beads is less than or equal to 3.7 $g/cm^3$.

14. The method of manufacturing a magnetic tape according to claim 9, wherein the second dispersion beads are diamond beads.

15. The method of manufacturing a magnetic tape according to claim 9, wherein the first stage obtains a liquid dispersion by dispersion processing solvent, binder, and ferromagnetic hexagonal ferrite powder having a $\Delta SFD_{powder}$ as calculated by Equation 2 that falls within a range of 0.05 to 1.90:

Equation 2

$$\Delta SFD_{powder} = SFD_{powder100°C} - SFD_{powder25°C}$$

in the presence of first dispersion beads, wherein, in Equation 2, $SFD_{powder100°C}$ denotes a switching field distribution SFD of the ferromagnetic hexagonal ferrite powder as measured in an environment with a temperature of 100° C., and $SFD_{powder25°C}$ denotes a switching field distribution SFD of the, ferromagnetic hexagonal ferrite powder as measured in an environment with a temperature of 25° C.

16. The method of manufacturing a magnetic tape according to claim 9, wherein the $D_{x(107)}/D_{TEM}$ of the ferromagnetic hexagonal ferrite powder contained in the magnetic layer of the magnetic tape falls within a range of 1/1 to 1.5.

17. The method of manufacturing a magnetic tape according to claim 9, wherein the crystallite volume as determined by X-ray diffraction of the ferromagnetic hexagonal ferrite powder contained in the magnetic layer of the magnetic tape falls within a range of 1,000 $nm^3$ to 1,500 $nm^3$.

* * * * *